Dec. 18, 1934.　　　F. H. SMITH　　　1,984,769
FILE TESTING MACHINE
Filed Dec. 28, 1933　　18 Sheets-Sheet 1
Fig.1.
Fig.2.
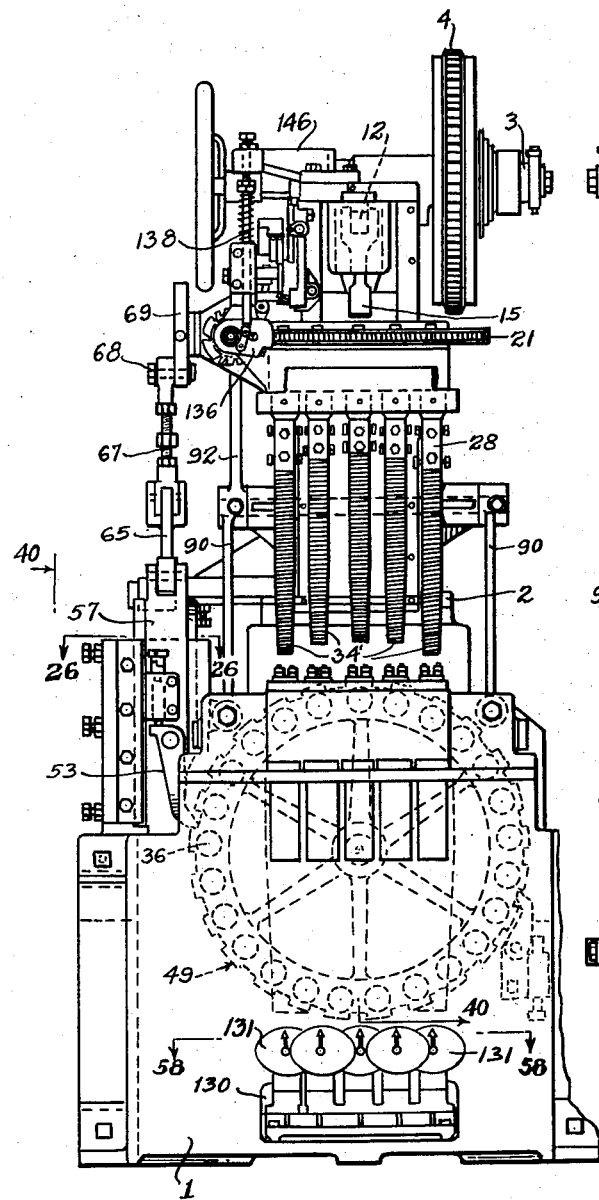
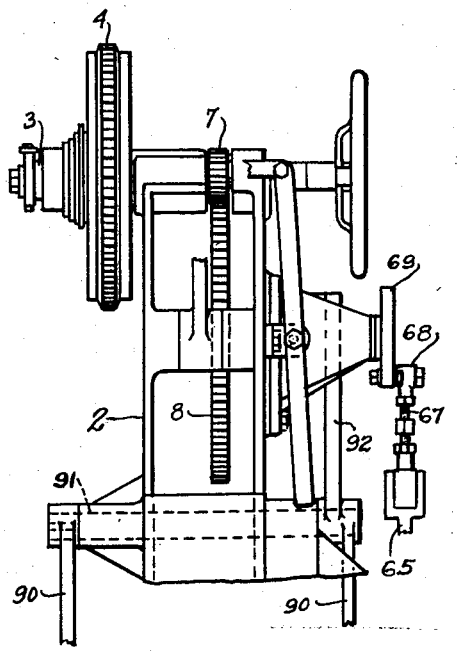
Fig.3.
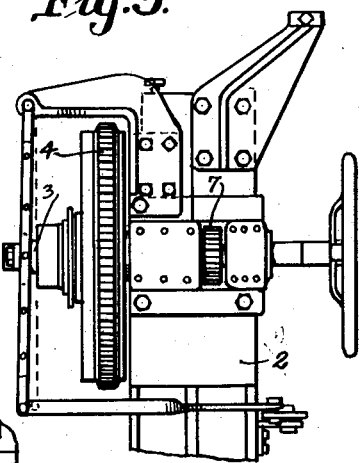
Inventor
F. H. SMITH
By Mason Fenwick Lawrence
Attorneys Dec. 18, 1934.    F. H. SMITH    1,984,769
FILE TESTING MACHINE
Filed Dec. 28, 1933    18 Sheets-Sheet 3

F. H. SMITH

Dec. 18, 1934.   F. H. SMITH   1,984,769
FILE TESTING MACHINE
Filed Dec. 28, 1933   18 Sheets-Sheet 4

Inventor
F. H. SMITH
By Mason Fenwick & Lawrence
Attorneys

Dec. 18, 1934.   F. H. SMITH   1,984,769
FILE TESTING MACHINE
Filed Dec. 28, 1933    18 Sheets-Sheet 5
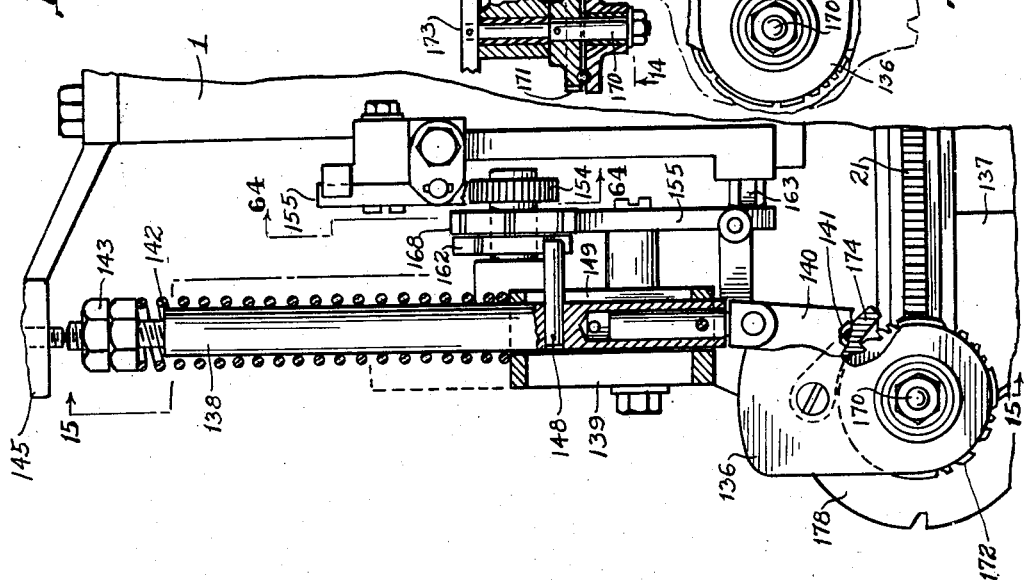
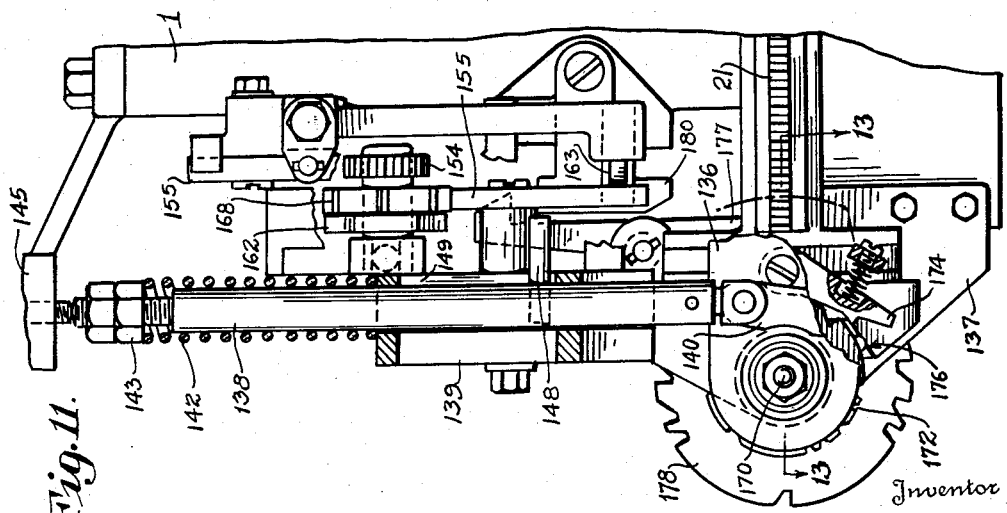
Inventor
F. H. SMITH
By Mason Fenwick Lawrence
Attorneys

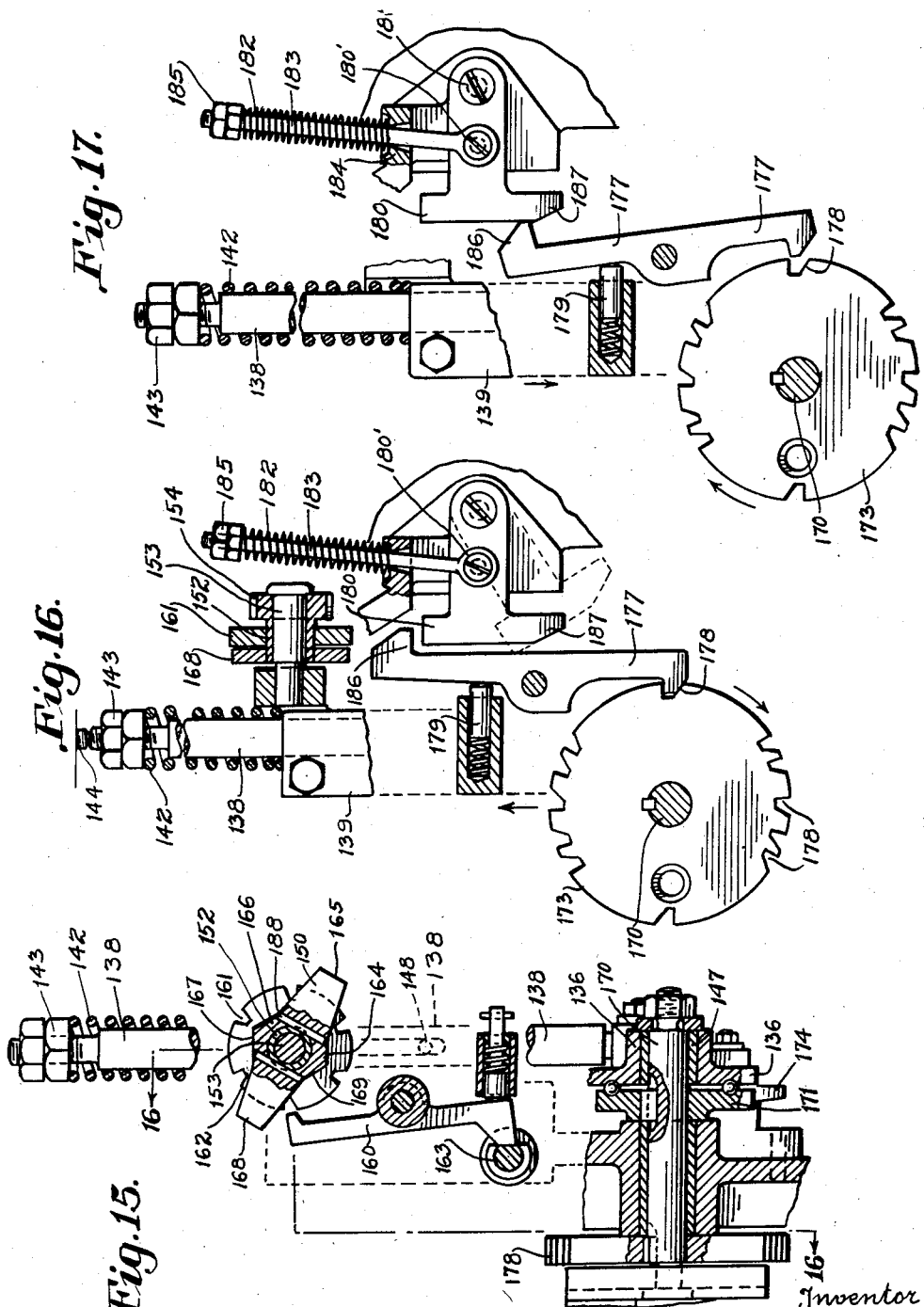

Dec. 18, 1934.  F. H. SMITH  1,984,769
FILE TESTING MACHINE
Filed Dec. 28, 1933  18 Sheets-Sheet 7
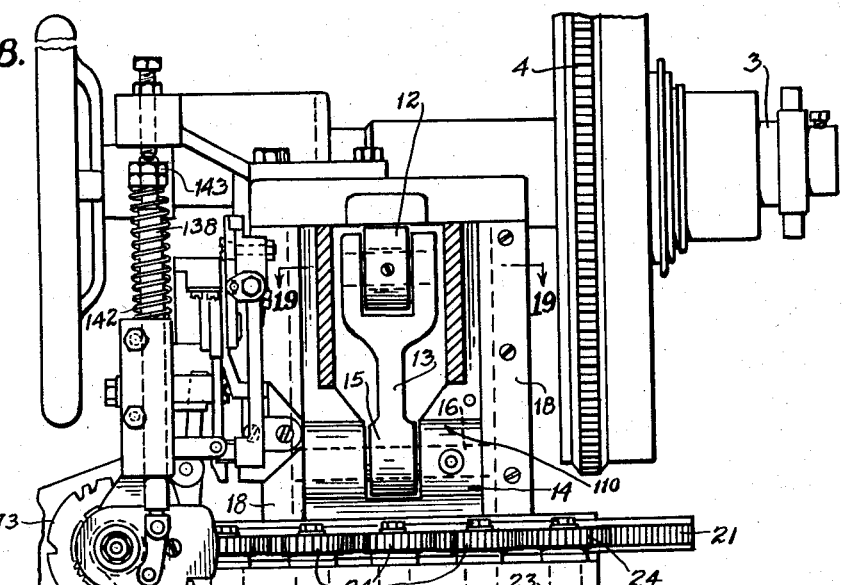
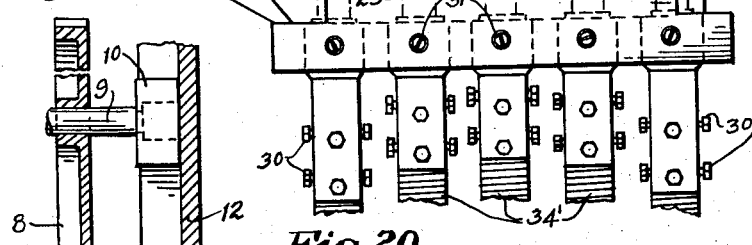
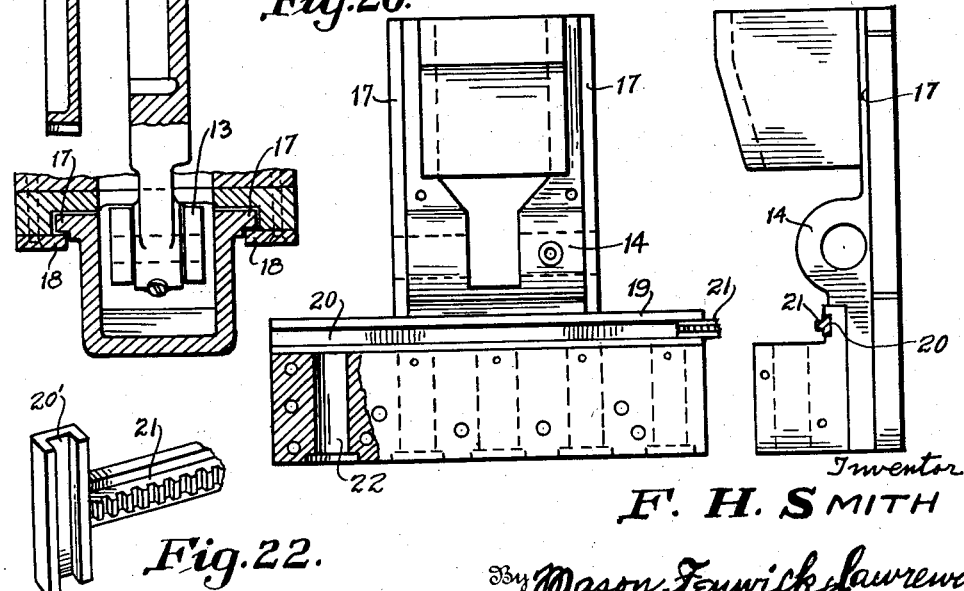
Inventor
F. H. SMITH
By Mason Fenwick & Lawrence
Attorneys Dec. 18, 1934.     F. H. SMITH     1,984,769
FILE TESTING MACHINE
Filed Dec. 28, 1933     18 Sheets-Sheet 8
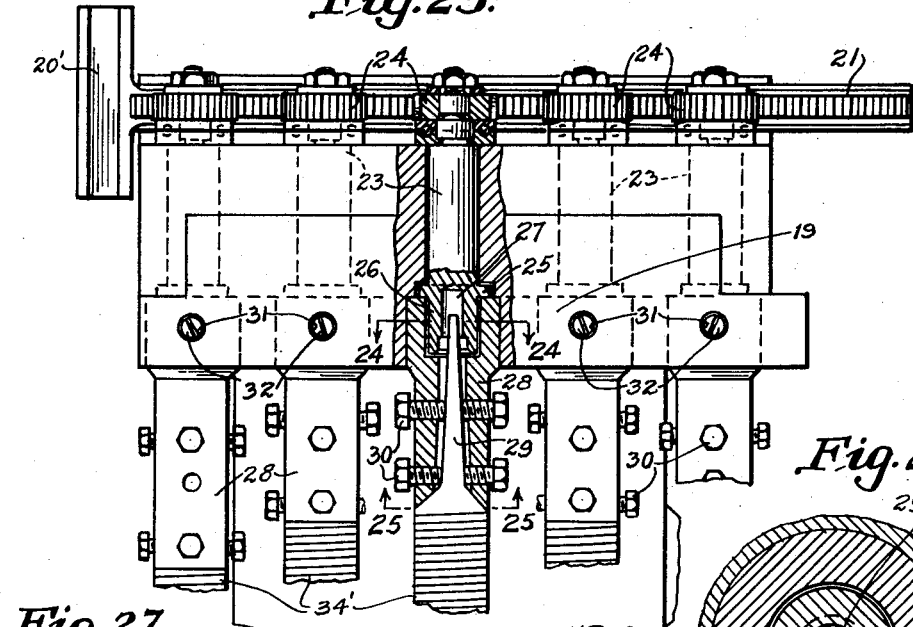
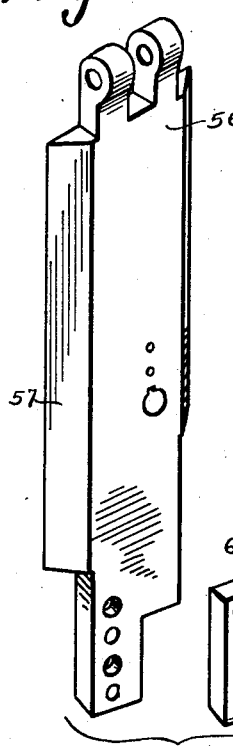
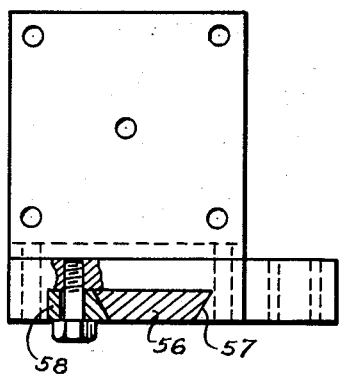
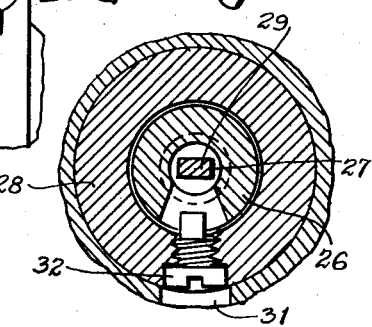
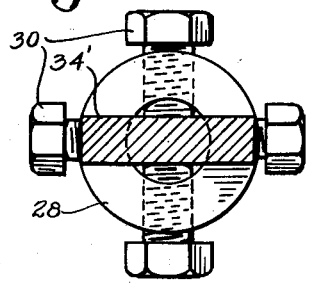
Inventor
F. H. SMITH
By Mason Fenwick Lawrence
Attorneys Dec. 18, 1934.  F. H. SMITH  1,984,769
FILE TESTING MACHINE
Filed Dec. 28, 1933  18 Sheets-Sheet 9

Inventor
F. H. SMITH
By Mason Fenwicke Lawrence
Attorneys

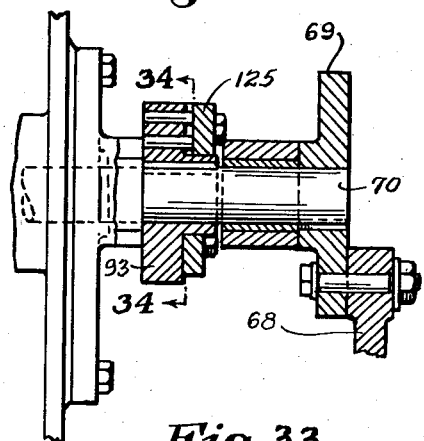
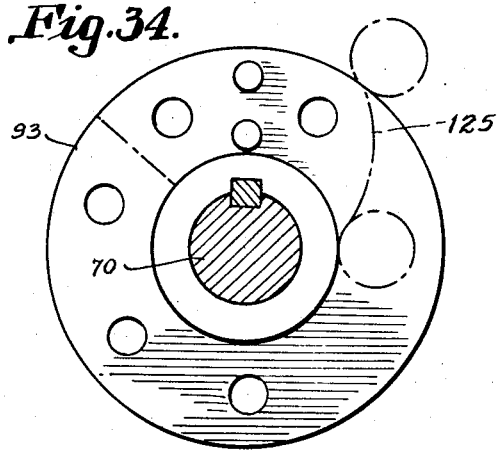
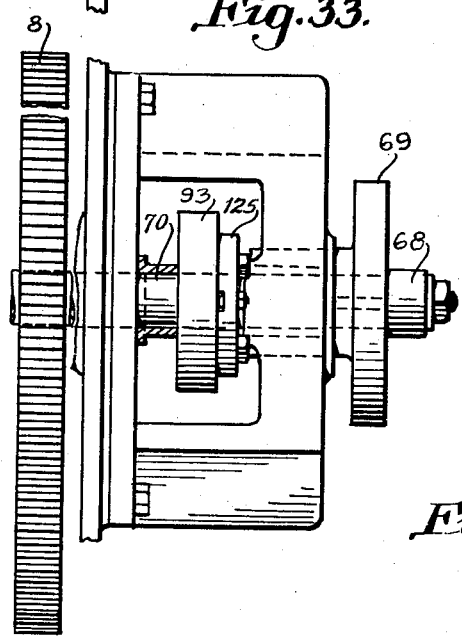
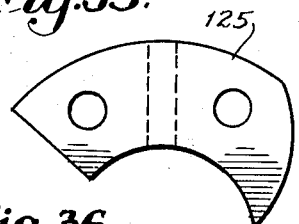
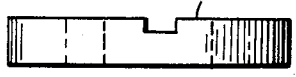
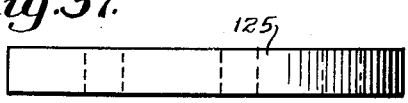
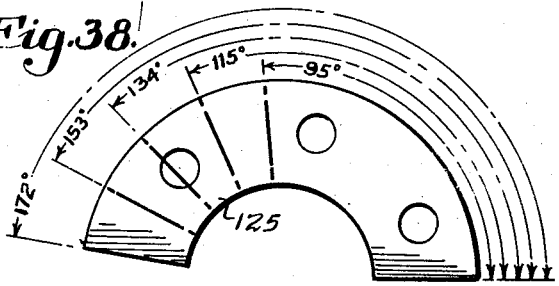

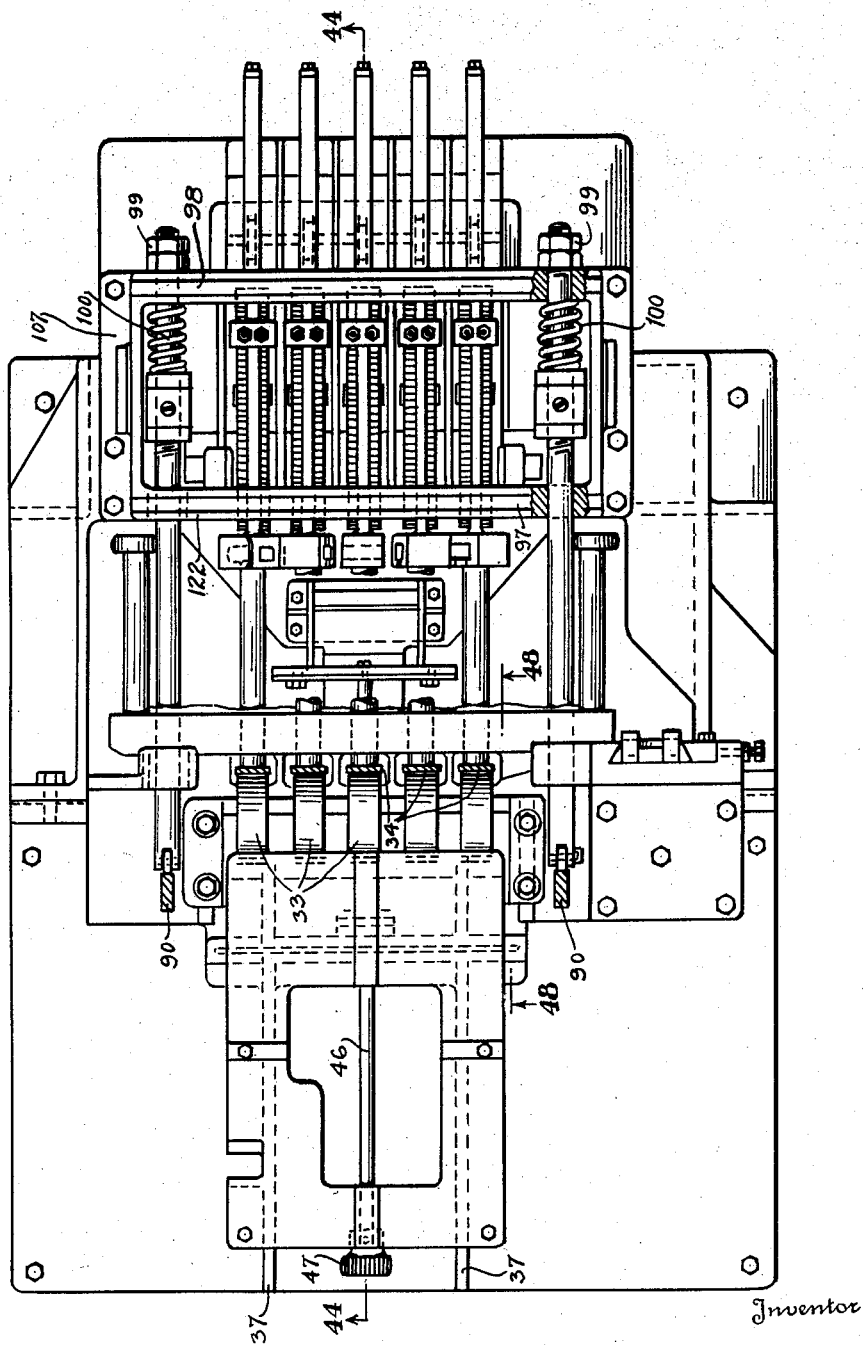

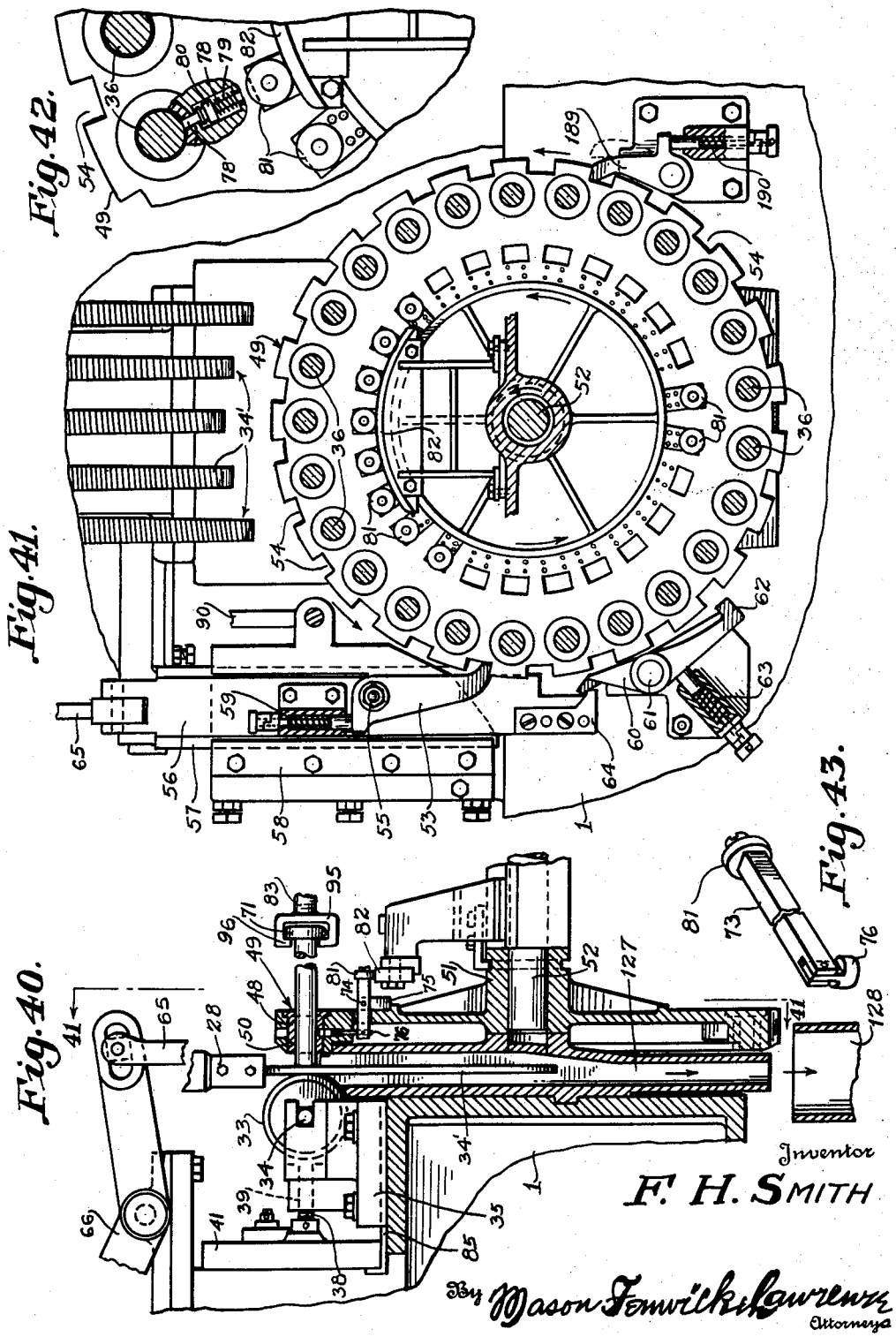

Dec. 18, 1934.  F. H. SMITH  1,984,769
FILE TESTING MACHINE
Filed Dec. 28, 1933   18 Sheets-Sheet 13
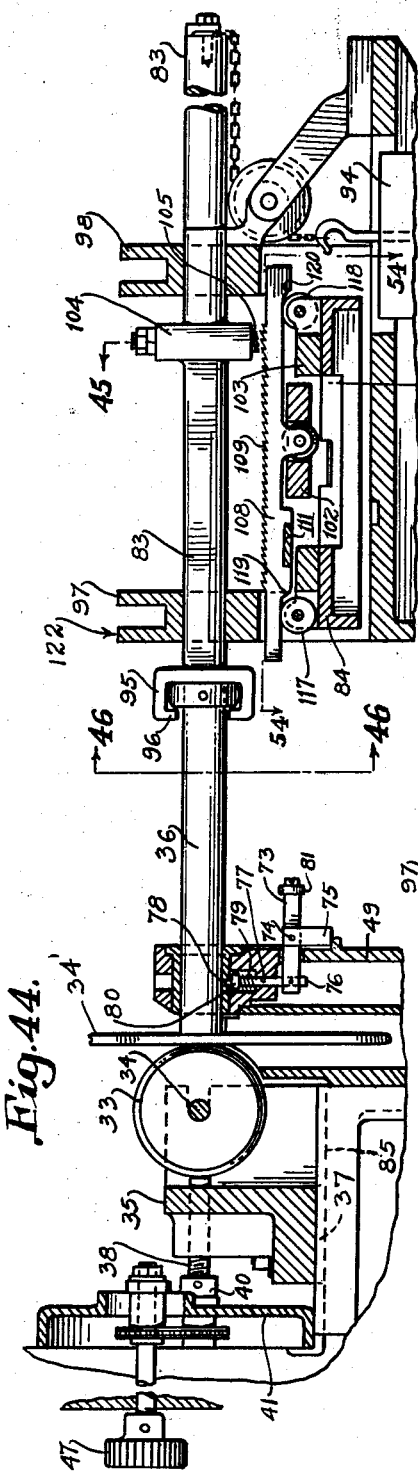
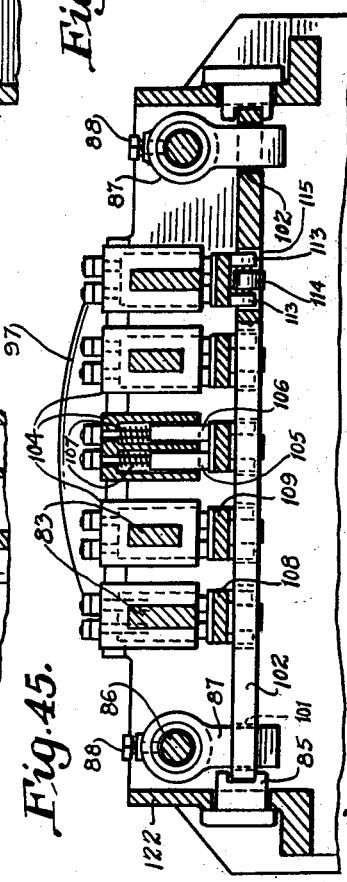
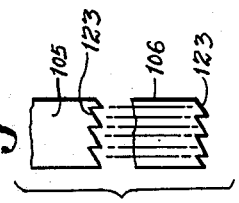
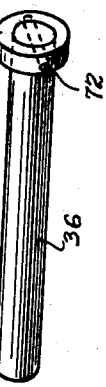
Inventor
F. H. Smith
By Mason Fenwick & Lawrence
Attorneys

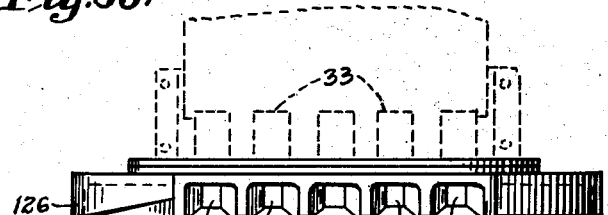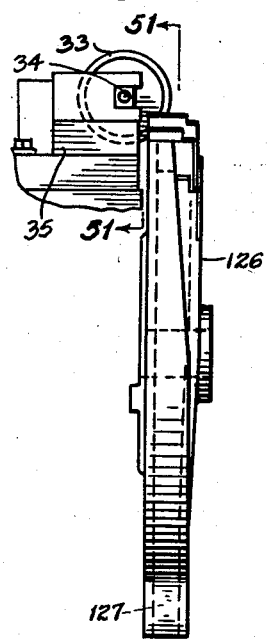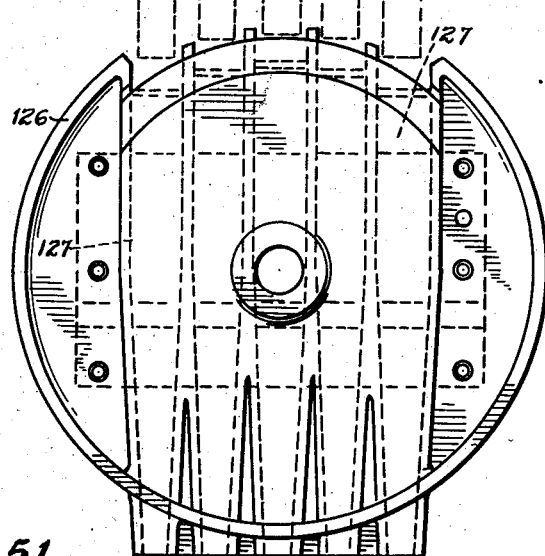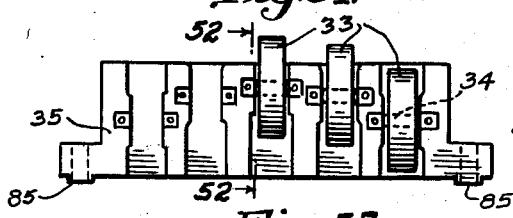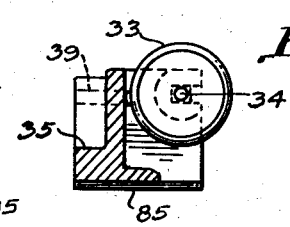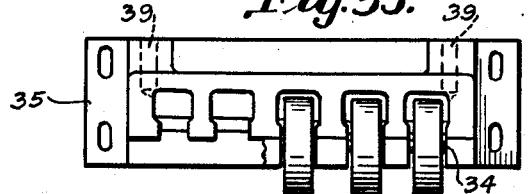

Dec. 18, 1934.     F. H. SMITH     1,984,769
FILE TESTING MACHINE
Filed Dec. 28, 1933     18 Sheets-Sheet 15

F. H. SMITH

By Mason Fenwick & Lawrence
Attorneys

Dec. 18, 1934.      F. H. SMITH      1,984,769
FILE TESTING MACHINE
Filed Dec. 28, 1933      18 Sheets-Sheet 16

Inventor
F. H. SMITH
By Mason Fenwick Lawrence
Attorneys

Dec. 18, 1934.  F. H. SMITH  1,984,769
FILE TESTING MACHINE
Filed Dec. 28, 1933   18 Sheets-Sheet 17

Inventor
F. H. SMITH
By Mason Fenwick Lawrence
Attorneys

Dec. 18, 1934.    F. H. SMITH    1,984,769
FILE TESTING MACHINE
Filed Dec. 28, 1933    18 Sheets-Sheet 18

Inventor
F. H. SMITH
By Mason Fenwick Lawrence
Attorneys

Patented Dec. 18, 1934

1,984,769

UNITED STATES PATENT OFFICE

1,984,769

FILE TESTING MACHINE

Frederick Herbert Smith, Cranston, R. I.

Application December 28, 1933, Serial No. 704,314

12 Claims. (Cl. 73—51)

This invention relates to file testing machines and it has for its object the provision of a machine for making comparative working tests of a plurality of files under conditions that make it impossible for the machine to favor any of the files. This is a feature the lack of which has characterized comparative testing machines as they have heretofore been constructed, for regardless of the precision with which two similar parts of a machine are made, there is inevitably enough inherent variation in them to make an appreciable cumulative difference in the work done by tools tested by such units after a number of repeated movements, so that files as tested entirely by different units of any machine are bound to show differences in cutting capacity, caused by variations in the units of the machine, and not truly indicative of the relative merits of the files.

The object of the present invention is to present to the working face of each file under test, successively and in rotation, a plurality of work pieces at constant pressure, all the files being moved across the work pieces simultaneously by a common carriage, so that every file at the end of the test shall have made the same number and length of strokes against each work piece, and with the same pressure, so that the conditions under which the files are tested are identical.

Another object of the invention is the provision of means for separately collecting and weighing the filings from each file, thus ascertaining the comparative cutting capacity of the files.

Still another object of the invention is the provision of a file testing machine of the type described, as a demonstrating and educational appliance in which the filings from each file are not only weighed, but their comparative weights indicated on a series of dials.

Another object of the invention is the provision of means for selectively adapting the machine to the testing of flat files, triangular files, square files, or files of any other cross section, and files of different lengths.

Other objects of the invention will appear as the following description of a preferred and practical embodiment of the file testing machine proceeds.

In the drawings:

Figure 1 is an end elevation of the file testing machine showing the files in position;

Figure 2 is a fragmentary elevation looking at the other end of the machine;

Figure 3 is a fragmentary plan of the parts shown in Figure 2;

Figure 11 is a section on the line 11—11 of Figure 7;

Figure 12 is a view similar to Figure 11 but with the parts shown in a different phase of the operation;

Figure 13 is a section on the line 13—13 of Figure 11;

Figure 14 is a section on the line 14—14 of Figure 13;

Figure 15 is a section on the line 15—15 of Figure 12;

Figure 16 is a section on the line 16—16 of Figure 15;

Figure 17 shows the parts illustrated in Figure 16 in a different phase of the operation;

Figure 18 is a section on the line 18—18 of Figure 5;

Figure 19 is a section on the line 19—19 of Figure 18;

Figure 20 is a front elevation of the sliding bracket adapted to hold the upper ends of the files;

Figure 21 is a side elevation of the sliding bracket;

Figure 22 is a fragmentary perspective of the reciprocating rack gear;

Figure 23 is an elevation of the rack gear and file supporting bracket with parts being shown in section;

Figure 24 is a section on the line 24—24 of Figure 23;

Figure 25 is a section on the line 25—25 of Figure 23;

Figure 26 is a section on the line 26—26 of Figure 1;

Figure 27 is a perspective view of the sliding bar shown in Figure 26;

Figure 32 is a section on the line 32—32 of Figure 4;

Figure 33 is a top plan view of the parts shown in Figure 32;

Figure 34 is a section on the line 34—34 of Figure 32;

Figure 35 is an elevation of one of the cam segments to be attached to the part shown in Figure 34;

Figure 36 is a plan view of the cam segments shown in Figure 35;

Figure 37 is a plan view of a modified form of cam segments similar to that shown in Figure 36;

Figure 38 is a face elevation of the cam segments shown in Figure 37;

Figure 39 is a section taken on the line 39—39 of Figure 4;

Figure 40 is a section taken on the line 40—40 of Figure 1;

Figure 41 is a section taken on the line 41—41 of Figure 40;

Figure 42 is a fragmentary elevation of the dial ratchet shown in Figure 41, showing a part of the cam mechanism and brake mechanism used to prevent movement of the work pieces;

Figure 43 is a perspective of one of the parts of the brake mechanism used to lock the work pieces against movement;

Figure 44 is a section on the line 44—44 of Figure 39;

Figure 45 is a section on the line 45—45 of Figure 44;

Figure 46 is a section on the line 46—46 of Figure 44;

Figure 46A is a diagrammatic detail view of the locking pawls used in connection with the ratchet bar shown in Figure 44;

Figure 47 is a detail perspective of one of the work pieces shown in Figure 44;

Figure 48 is a side elevation of the casting which is provided with chutes to receive the files and the filings dropping therefrom;

Figure 49 is a face elevation of the casting shown in Figure 48;

Figure 50 is a top plan view of the casting shown in Figure 49 with associated parts shown in dotted lines;

Figure 51 is a section on the line 51—51 of Figure 48;

Figure 52 is a section on the line 52—52 of Figure 51;

Figure 53 is a top plan view of the parts shown in Figure 51;

Figure 4:
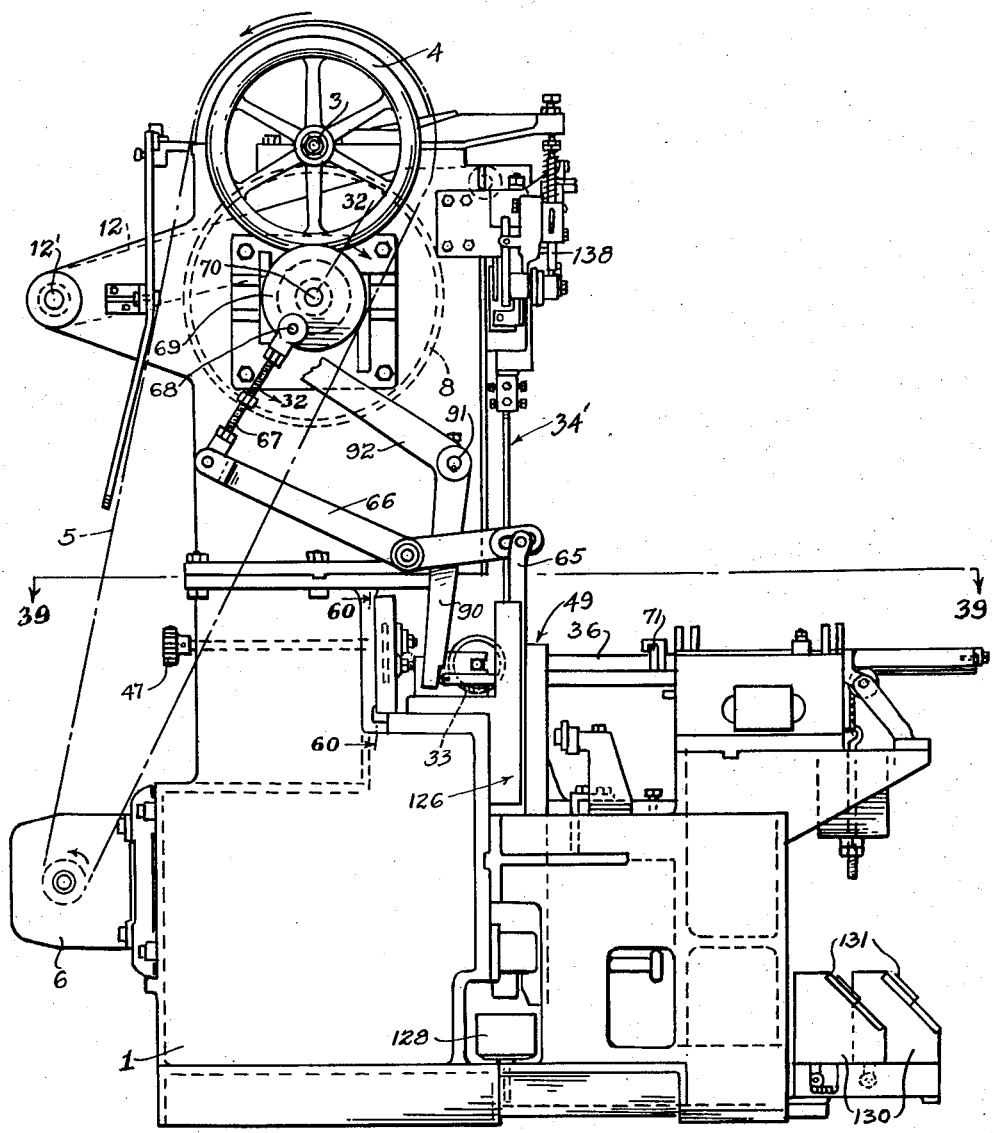
Figure 4 is a side elevation of the file testing machine.

Referring now in detail to the numerous figures, and first adverting to the general assembly illustrated in Figure 1, the machine is constituted by a be 1 having a standard 2. A shaft 3 is carried by suitable bearings in said standard, said shaft carrying a sprocket 4 which by means of a chain 5 indicated diagrammatically in Figure 4 is connected to a source of power indicated by the electric motor 6. The shaft 3 has a small gear 7 which drives a bull wheel 8.

Figure 5:
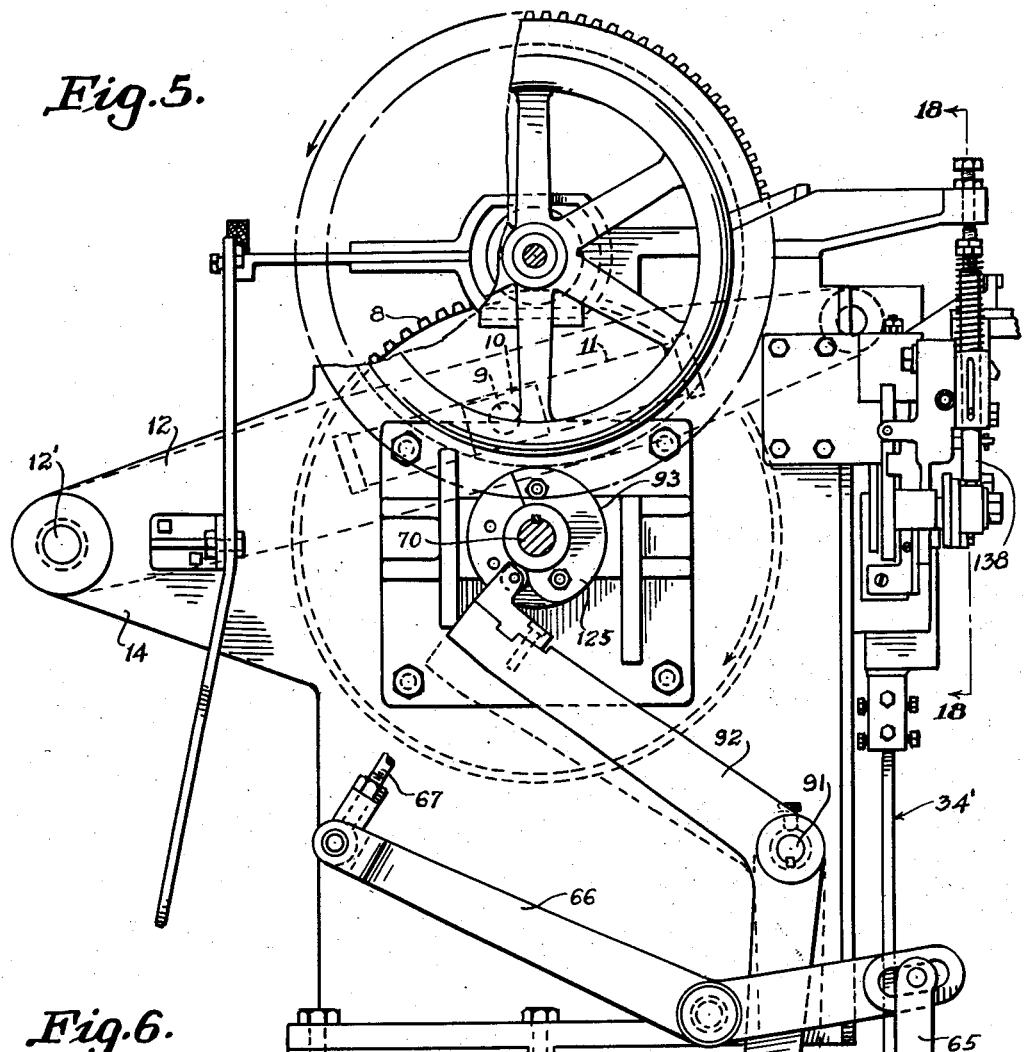
Figure 5 is a side elevation of the upper portion of the machine with parts broken away.
Figure 6:
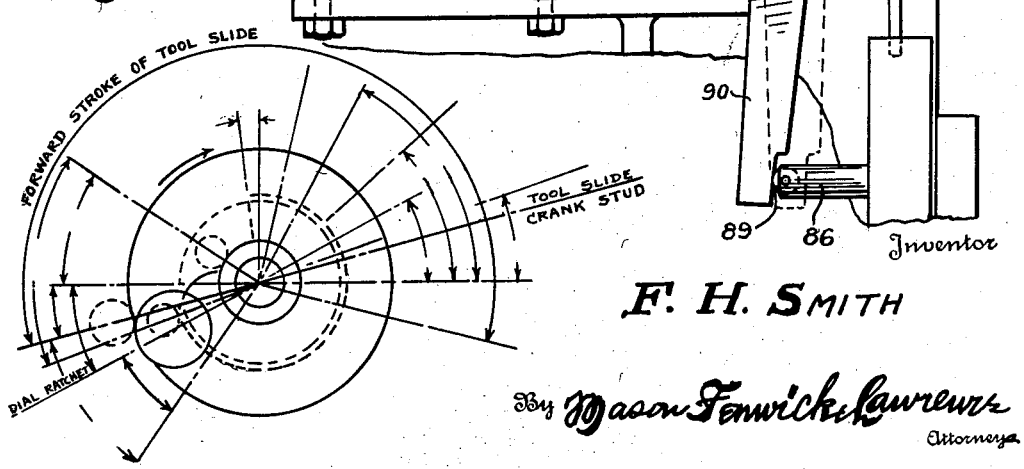
Figure 6 is a diagram showing the relative position of some of the parts of the machine.

Now, referring to Figure 5 it will be observed that the bull wheel 8 has a crank pin 9 journalled in a block 10 which slides in a guide slot 11 formed in an oscillating lever 12, the latter being pivoted at 12' to a fixed bracket 14. Rotation of the bull wheel causes oscillation of the lever 12. Referring once again to Figure 1, the front end of the oscillating lever 12 is shown connected to a substantially vertically depending link 13. This element can be seen on an enlarged scale in Figure 18. A carriage 110 which is also best shown in Figure 18 is pivotally connected to the lower end 15 of the link 13, the connecting pin 16 being indicated in broken lines. Details of the carriage are shown in Figures 20 and 21, it being noted that the carriage has side flanges 17 which slide in vertical guideways provided behind the gibs 18 screwed to the standard. Affixed to the lower end of the carriage is a member 19 having a transverse track 20 and a rack bar 21, and below said rack bar and forwardly of the same, the member 19 is provided with vertical axially parallel bearing apertures 22 adapted to receive the chuck spindles 23, shown in Figure 18, the upper ends of which spindles carry gears 24, meshing with the rack bar 21, and rotated by the reciprocation of said rack bar. The chuck spindles are shown in detail in Figure 23, being each provided near its lower end with a shoulder 25 and a centering boss 26, the latter being internally apertured as at 27, from the lower end of the spindle. Said spindles are designed to have file chucks 28 attached thereto.

In the present exemplary embodiment of the invention, provision is made for testing five files simultaneously. Consequently, there are five chuck spindles and five file chucks. In allocating the files in the machine, the file chucks are first taken out of the machine and affixed to the tangs 29 of the files by means of set screws 30 which are screwed in or backed off until the file is positioned with its median axis coincident with the axis of the file chuck. This adjustment is accurately made while the file and chuck is held in a special fixture. The file chucks are then pushed up into sockets in the bottom ends of the member 19, surrounding the centering bosses 26 and abutting the shoulders 25, all as shown in Figure 23. The lower forward side of the member 19 is provided with a plurality of bores 31, see particularly Figure 24, giving access to set screws 32 adapted to enter holes in the file chucks and centering bosses which holes may be brought into alinement by rotating the file chuck. A screw driver may be inserted through the bores 31 in order to tighten the set screws 32. When the set screws are screwed home, their heads lie either flush with or slightly below the peripheral surface of the file chuck 28.

The files, when the file chucks are in place, are self-alined, when they come into contact with the backing rollers 33 and work bars 36, Figure 44, by swivel clearance provided between the spindle head 26 and the file chuck 28, by means of screw teat and elongated slot, Figure 24, and clearance between spindle heads 26 and file chucks 28. The files are held rigidly sideways by means of contact between the file chucks 28 and the member 19.

Figure 60:
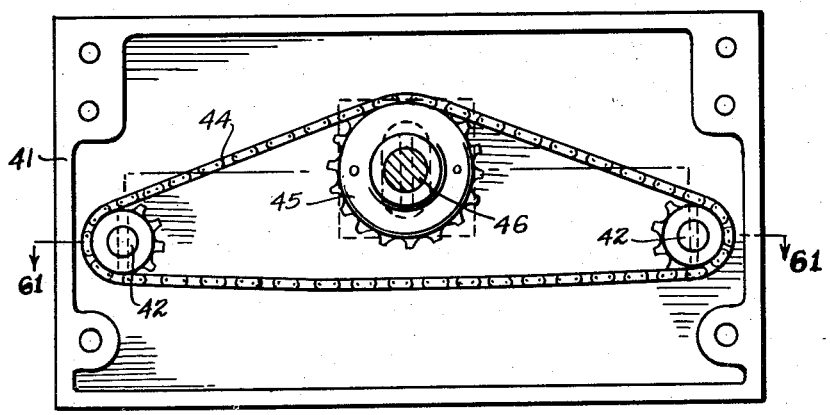
Figure 60 is a section taken on the line 60—60 of Figure 4.
Figure 61:
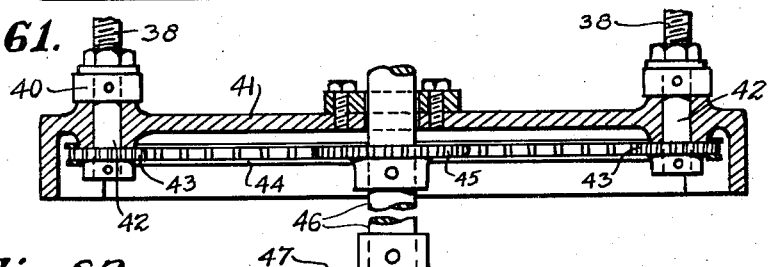
Figure 61 is a section taken on the line 61—61 of Figure 60.
Figure 62:
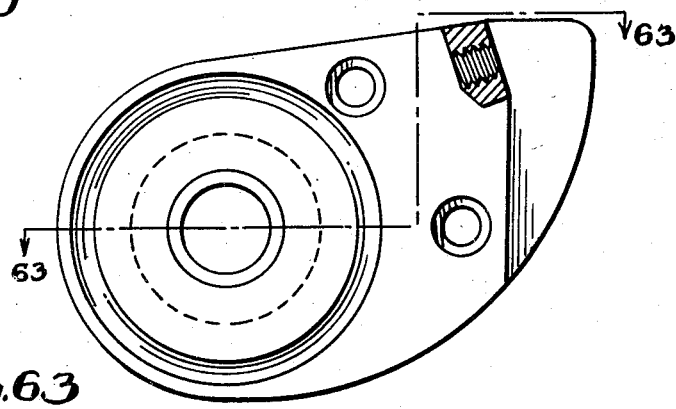
Figure 62 is a bottom plan view partly in section of the plate used in connection with the tool revolving mechanism.
Figure 63:
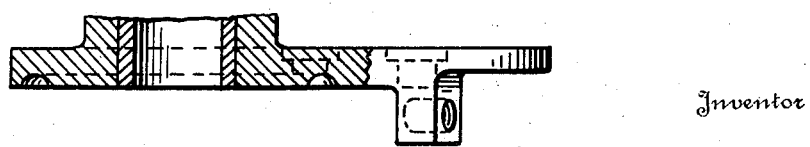
Figure 63 is a section on the line 63—63 of Figure 62.

The rollers 33 are journalled upon pintles 34, constituting file backing rolls, see Figure 51, mounted in a sliding carriage 35. Said carriage is precisely guided for rectilinear motion toward the files by slides 85 operating in guideways 37, Figures 39 and 44. The carriage 35 with the rollers 33 is adjusted to or from the vertical plane in which the files extend by screws 38 threaded into sockets 39 in the carriage and in sleeves 40 carried by a stationary support 41. The outer ends 42 of the screws 38 constitute shafts journalled in bearings in the support 41 and having at their outer ends sprockets 43 connected by a chain 44, said chain passing over a sprocket 45 fixed to the stem 46 of an operating knob 47, see Figures 60 and 61. When the knob is turned in either direction, the carriage 35 is advanced or retracted by the action of the screws 38, by which means backing rolls are accurately set for files of various thickness. After setting the rolls, the carriage is securely clamped with four bolts.

Figure 51 shows that the rollers are mounted arcuately.

The files, depending vertically from the file chucks are shown at 34' in Figure 1, and it will be noted that the central file chuck is shorter than the other file chucks and that the file chucks on either side of the center are progressively lengthened, so that the lower ends of the file chucks are arranged in an arc which corresponds in curvature to the arc of the rollers 33. The curvature of this arc also corresponds to the arc of the annular battery of the test bars 36 which may be brought, as will presently be described, into scraping contact with the files when the latter are moved downwardly through the descent of the carriage 14. It will be observed from Fig. 44 that the test bars 36 press the files directly opposite the rollers 33 so that the files will not yield or be deflected from the plane in which they are mounted. The arcuate relation of the file chucks to the test bars ensures a cutting stroke of equal length for each of the files and for every test bar.

The test bars 36 which in the present exemplary embodiment of the invention are twenty-five in number, although this is immaterial, are slidably mounted in bores 48, Figure 40, arranged at equal distances and with parallel axes in a peripheral series transversely of a dial 49. The bores are preferably provided with bushings 50 of wear-resisting material. The dial 49 has a hub 51 rotatable upon a pin 52. The spacing of the files 34 is such that in any operative position of the dial, five test bars are in alinement respectively, with the paths of movement of the five files.

Step by step rotation is imparted to the dial 49 by means of a pawl 53, the end of which engages in notches 54 aranged circumferentially with respect to the dial. The pawl 53 is pivoted at 55 to a block 56, the edges 57 of which are slidably retained in a fixed guideway 58. The pawl 53 is biased into engagement with the notches 54 by a spring 59. When the block 56 moves downward, the pawl advances the dial 49 one step. When the block 56 is raised, the pawl yields against the spring 59 so as to slip over the elevations between successive notches, into the next notch. In order to prevent the pawl 53 from moving the dial too far, a limiting pawl 60 is provided, mounted on a fixed pivot 61 and having a nose 62 normally urged into engaging position with one of the notches by a spring 63. The pawl 60 is however held out of engagement with the notches by a cam 64 carried by the block 56 and engaging the end of said pawl. When the pawl 53 has moved the dial 49 the distance of one tooth, the end of the cam 64 has slid down the back of the contacting end of the pawl 60, permitting the latter to be moved into a tooth space under the influence of the spring 63 so that any excess movement of the pawl 53 brings the abrupt advance shoulder of a tooth into engagement with an equally abrupt nose of the pawl. In order to prevent retrogressive movement of the dial, a holding pawl 189 is provided, being biased toward the notches between the teeth of the dial by a detent 190.

Motion is imparted to the block 56 by means of a connecting rod 65, see Figures 1, 44, 4 and 5, connected to a bell crank lever 66, which is connected by means of the link 67 with a crank pin 68 carried by a crank wheel 69 mounted upon the shaft 70 of the bull wheel 8.

The test bars are made of cylindrical stock of any desired quality or hardness and cut into suitable lengths. Figure 47 shows one of these test bars 36 and before mounting it in the testing machine, it is provided with a circular head 71 secured by a pin 72 or in any other suitable manner. In order to keep the test bars when mounted in the dial 49 from inadvertently slipping in the sleeves 50, braking arrangements are provided individual to the test bars comprising a lever 73 pivotally mounted at 74 to a bracket 75 fixed to the dial 49, said lever having at one end a pivotally mounted plunger 76 extending through a radial bore 77 in the dial and having its end 78 adapted to press against the test bar through the resilient pressure provided by a spring 79, abutting against a collar 80 on the plunger. The opposite end of the lever 73 has a roller 81.

It will be understood that since five of the test bars are involved at a time in the cutting operation of the files, these five should have the braking arrangement released so that they may be freely brought into contact with the files by other instrumentaliies presently to be described. Consequently, a fixed cam 82, Figure 41, is provided in a position to engage the rollers 81 as each test bar assumes its operative position with respect to the first of the series of the five files and to retain its engagement with five rollers while they are in alinement with the paths of the files. This cam, by raising the rollers, retracts the plungers against the tension of the springs 79 and thus releases the brakes on the five test bars involved. The other rollers being untrammelled, permit the braking mechanism to remain in frictional engagement with the test bars which are not being worked upon.

Figure 55:
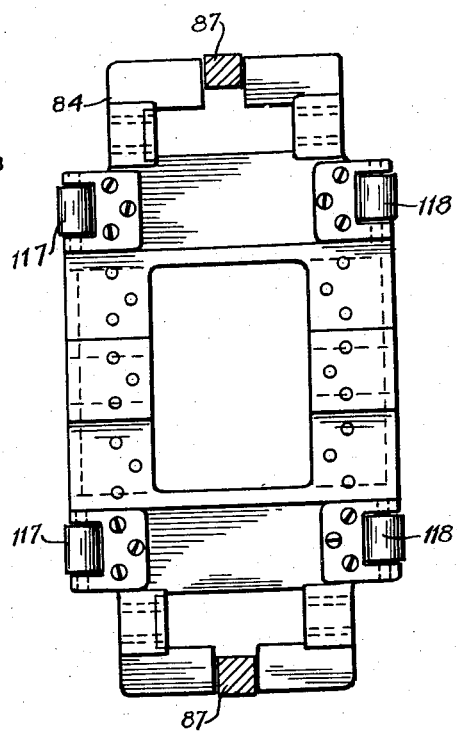
Figure 55 is a plan view of the carriage that is provided with rollers and is arranged below the ratchet bars shown in Figure 54.
Figure 56:
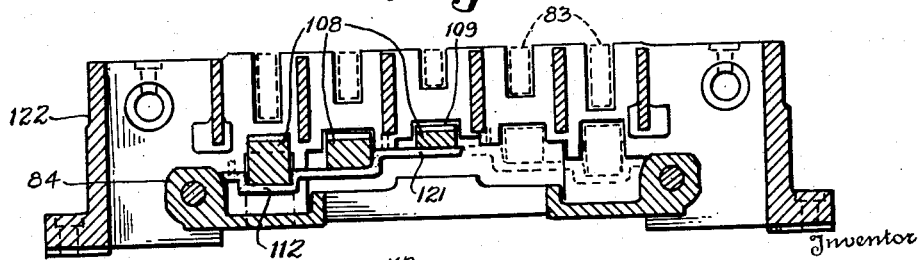
Figure 56 is a section taken on the line 56—56 of Figure 54.
Figure 57:
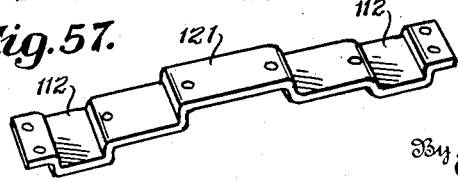
Figure 57 is a detail perspective of the latch bar used in connection with the ratchet bars.

Since the main purpose of the invention is to provide a comparative test for several files entirely free from any factor of inadvertent mechanical favoritism, it is essential that the test bars be fed against the files at a certain definite moment and with a definite pressure and for a definite duration. Feeding means for the test bars are therefore provided comprising a series of five bars 83 slidably mounted in the transverse frame members of a frame 122. Since these bars must not rotate, they are polygonal, at least in those portions which slide within correspondingly shaped apertures in the frame members within the frame. A carriage 84 is slidably mounted for forward and rearward motion relative to the plane of the files, and the sliding movement is accomplished by means of a pair of reciprocating rods 86 passing through apertures in the front and rear frame members 97 and 98 and being retained by end nuts 99. Depending lugs 87 are fixed to said bars between the said frame members by means of set screws 88, and extend down into notches in the sides of the carriage, see Figure 55, constituting a driving connection for said carriage. Springs 100 are positioned between said lugs and the frame member 98.

Figure 54:
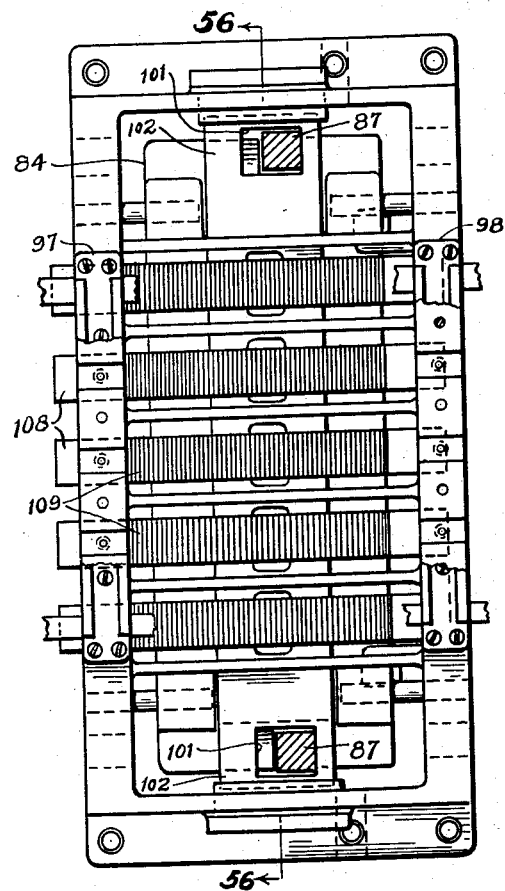
Figure 54 is a section on the line 54—54 of Figure 44.

A plate 102 rests upon the carriage and travels therewith with some lost motion, the lugs 87 extending downwardly through suitable apertures 101 formed in the opposite ends of said plate, see Figure 54, which apertures are larger than the lugs.

The carriage 84 is provided at its opposite end with a series of rollers 117 and 118, the rollers of each series in the present instant being five in number, and mounted co-axially. They rise above the level of the carriage and afford support for a series of five rack bars 108 provided with uni-directional teeth 109 facing rearwardly, that is to say, away from the files. On their lower sides, the rack bars have lugs 113 in which anti-friction rollers 114 are journalled, said rollers fitting in slots 115 formed in the plate 102. The rack bars are also each formed on their underside with a recess 111, the inner walls of said recesses resting upon seats 112 on a latch bar 121, the latter being fixed to the frame 122.

The series of bars 83 are arranged acruately as will appear in Figure 45, the curvature of said arc corresponding to that of the test bars. The forward ends of the bars 83 are provided with cages 95 open laterally and adapted to receive the heads 71 of the test bars as the dial performs its step by step rotation. The relation of the heads of the test bars to the cages 95 is well illustrated in Figure 46. The cages have flanges 96 overhanging the forward faces of the heads 71 preventing the escape of the test bars 36 in an axial direction. Thus when the bars 83 are advanced or retracted, the test bars will be correspondingly moved. At the same time, however the machine is so synchronized that in the position of repose of the test bars 83, the cages are in the path of rotation of the test bars so that as the dial moves step by step, fresh test bars enter the series of cages one by one, those test bars that have been worked upon being discharged one at a time from the series of cages. The test bars rotate repetitively through the cages 95, receiving a single stroke from each of the files in the course of each complete revolution of the dial 49.

Each of the feed bars 83 is formed or otherwise provided with a pawl housing 104. These pawl housings extend unequal distances below the bars of which they form a part so that their lower faces terminate in a horizontal plane adjacent the toothed faces of the rack bars 108. Figure 45 shows one of the pawl housings in section from which it will be observed that it contains a pair of pawls 105 and 106. These pawls are projected by means of springs 107 against the teeth 109 of the rack bars. The pawls are provided on their active faces with teeth 123 and it will be observed from Figure 46A that the teeth of one pawl are slightly displaced in the longitudinal direction of the rack bar. The pawls and rack bars constituting a clutch, affording an adjustment for the feed of the test bars to the files compensating for uneven wear resulting from non-uniformity in the hardness of the material of the several test bars, and the displaced relation of the teeth of the pawls 105 and 106 halves any error in adjustment so that if one pawl happens to fall at an intermediate point on a tooth of the rack bar, the other pawl will be against the shoulder of a tooth.

Figure 5 shows that the rearward ends of the bars 86 are provided with anti-friction means 89 engaging the ends of levers 90 arranged at opposite ends of a lay shaft 91, one of said levers 90 being formed as a bell crank having an upwardly extending arm 92 engaging a cam 93 carried by the shaft 70 of the bull wheel. Thus motion is imparted to the carriage in the rearward diretion by the levers 90 and motion in the opposite direction is produced by the weights 94 secured to the rear ends of the feed bars 83, while the pawls 105 or 106 are in mesh with the rack bars, and by the springs 100 when the pawls and rack bars are released.

The operation of the feeding means will now be described. It will be assumed that the parts are in the position shown in Figure 44 with the test bars in working relation with respect to the files and the pawls 105 or 106 out of registry with the teeth of the rack bars. The bars 86 begin to move forward pressed by the levers 90. This causes the lugs 87 which are fixed to the rods 86 to immediately move the carriage 84, there being no lost motion between said lugs and said carriage. The rack bars however during this initial movement of the carriage are not urged to travel longitudinally by the plate 102 on account of the lost motion between the lugs and this plate as indicated in Figure 54. In the continuance of the rearward motion of the carriage 84, the rollers 117 and 118 engage cam surfaces 119 and 120 on the underside of the rack bars lifting said rack bars into engagement with one of the pawls 105 or 106 and releasing said rack bars from the latch bar 121. The value of the lost motion in the plate 102 is now apparent, for if the plate 102 attempted to draw the rack bars rearwardly at the beginning of the movement of the carriage, before the rollers 117 and 118 could engage their corresponding cam surfaces, binding action would be produced upon the latch member before the rack bars could be lifted, stalling the machine.

By the time the rack bars have been elevated into engagement with the pawls, the lost motion between the plate and the lugs 87 has been taken up, and the plate becomes a positive driving element, moving the rack bars rearwardly synchronously with the carriage, drawing back the feed bars 83 and retracting the test bars.

When the levers 90 have completed their rearward stroke and the carriage and rack bars are as far back as possible, the levers 90 begin to recede, permitting the feed bars 83 which are coupled to the rack bar through the pawls 105 or 106 to move forwardly under the urge of the weights 94. However, in the meantime, the springs 100 which are livelier than weights on account of the predominant inertia of the latter having expanded, throwing the rods 86 forwardly at a faster rate of travel than the rack bars 108, causing the carriage to roll forwardly relative to the rack bars permitting the latter to descend, releasing the ratchet teeth 109 from the teeth of the pawls. Here again the lost motion between the lugs 87 and the plate 102 comes into play, for if the expansion of the springs 100 acted simultaneously upon the plate 102 and the plate 103, there could be no relative motion between the carriage and the rack bars.

The feed bars 83 having thus been released, push the test bars 36 into contact with the files with a constant and definite pressure determined solely by the weights 94. It will be understood that the connection between the pawls and rack bars is always made when the test bars are against the files so that there can never be misalinement of the cages 95 greater than the value of one-half the width of a tooth of the rack bar. This ensures that the cages 95 shall always be in the path of rotation of the heads of the test bars when the latter are successively presented through rotation of the dial.

The files perform a single stroke against the test bars at each presentation of the latter, and when the test bars are withdrawn, the files are turned so as to present another surface for the next cut. A flat file will be rotated through 180°, a triangular file through 120°, a square file through 90°, etc., as will presently be explained. It is frequently desired to test files of different length, for instance 8 inch files may be tested at one time, and at another, 12 inch files. This is accomplished by lengthening or shortening the duration of contact of the test bars with the files through a series of interchangeable cams 93, Figure 5.

In order to keep the test bars pressed against the files for the duration of this extended range of travel, the cam 93 is formed with an additional part 125 shown in Figures 5 and 35 which may be taken off so as to proportionately increase the duration of the retrogressive period of the levers 90.

Figure 58:
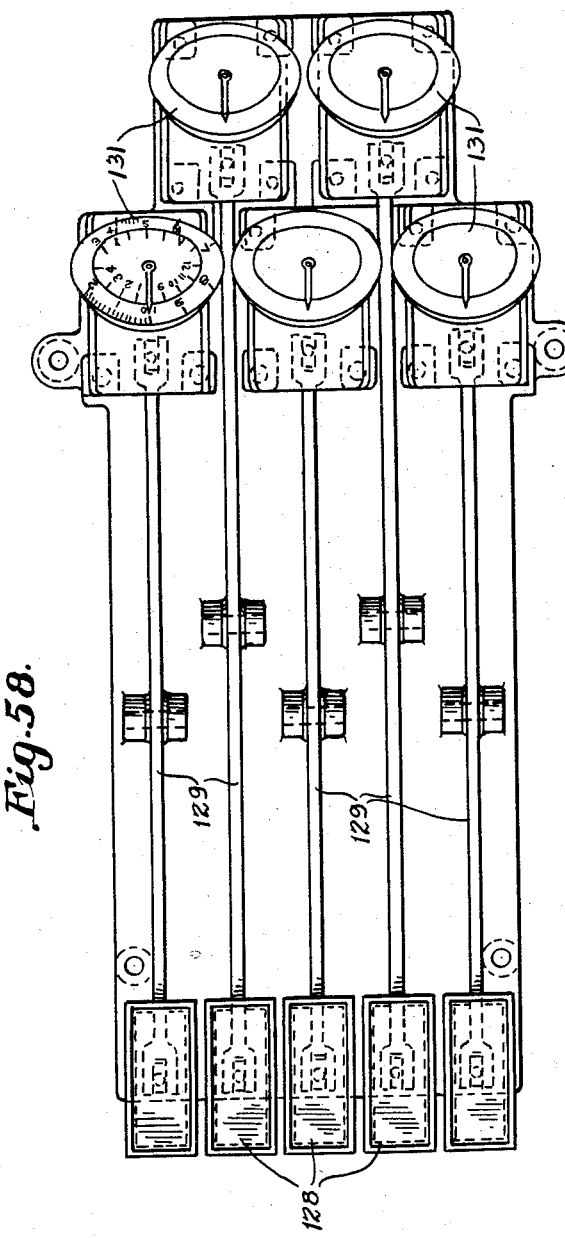
Figure 58 is a section on the line 58—58 of Figure 1.
Figure 59:
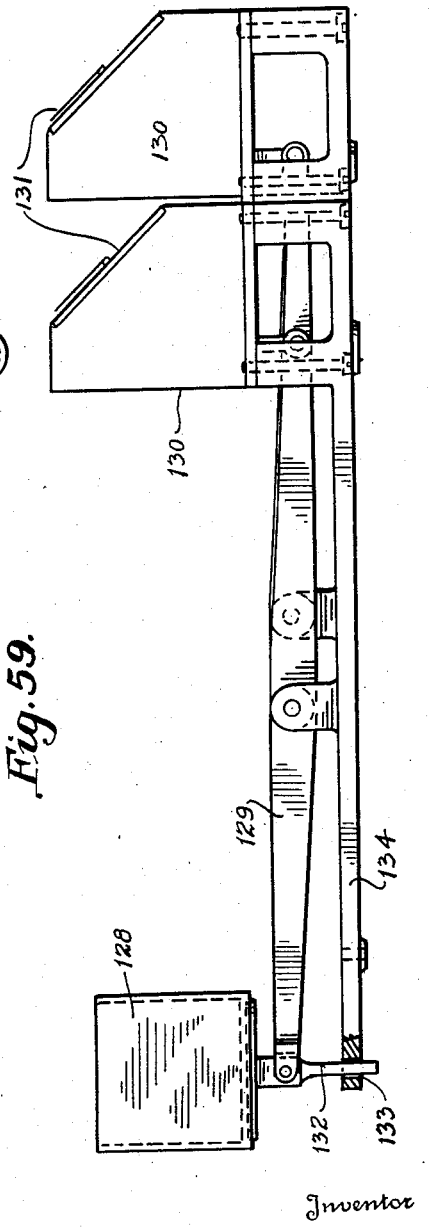
Figure 59 is a side elevation of the parts shown in Figure 58.

A casting 126, see Figures 40 and 49 is mounted beneath the point at which the test bars contact with the files, and formed with chutes 127 individual to the files and into the upper portions of which the files extend as indicated in Figure 40 during their range of travel. The lower ends of the chutes are arranged to discharge into cups 128, Figures 40, 58 and 59, individual to said chutes for catching and collecting the filings cut from the test bars by the several files. The cups 128 are arranged at one end of scale beams 129, the other ends of said scale beams being connected to suitable weighing mechanism, not shown in detail, but represented by the spring scales 130 having dials 131. Said dials are arranged in close adjacency so that the comparative weight of the filings produced by the several files may be ascertained. The cups 128 are maintained upright by means of a projection 132 fixed to the bottom of said cups and sliding through an aperture 133 in a supporting plate 134.

Reverting once again to the rack bar 21 having the transverse track 20 and engaging the gears 24 which rotate the files, the track 20 serves as a runway for a crank pin 135 mounted on a locking plate 173. Said plate is intermittently revolved through ratchet 171 and pawl 174. Ratchet pawl 174 is carried by an oscillating plate 136, Figure 13, attached to bracket 137 and together with the rack bar and the mechanism that holds the files, travels upwardly and downwardly with the carriage 14. The plate 136 has a range of oscillation through an arc of 90°, and is oscillated by means of a plunger 138 slidably mounted in a guide 139 carried by the bracket 137. The lower part of the plunger 138 is made flexible through the provision of a pivoted link 140 pivoted to the plate 136 at 141. The link 140 permits a slight deflection in the line of force transmission through the plunger and eases the oscillation of the plate at the extreme lower limit of its range of oscillation.

A spring 142 surrounds the upper portion of the plunger being confined between the upper end of the guide 139 and a nut 143 at the upper end of the plunger. A stop 144 adjustably mounted in a lug 145 of a fixed bracket 146 is in line with the upper end of the plunger 138 to be engaged thereby when the carriage 14 together with its parts which travel unitarily therewith, comes adjacent the upper limit of its range of travel. When the carriage moves downward, the plunger retreats from the adjustable stop.

It is of course essential that while the files are working on the test bars rotation of the same must be inhibited and that the faces of the files presented to the test bars are changed on the up-stroke of the carriage when the test bars have been withdrawn from the faces of the files as has been explained. When the carriage and the plunger are moving downward, there can be no relative movement between these members and consequently, there is no oscillation of the plate 136, no movement of the rack bar 21 and it is during this period that the files remain with their faces oriented towards the test bars. On the upward travel of the carriage 14, and while the test bars are withdrawn, the files still remain with their faces non-rotatably presented toward the test bars, but near the upper limit of the upward stroke of the carriage the plunger 138 comes in contact with the stop 144. Further upward movement of the plunger is thereby prevented, and the carriage travelling further up causes the plate 136 to be oscillated downward about its pivotal connection 147.

Figure 8:
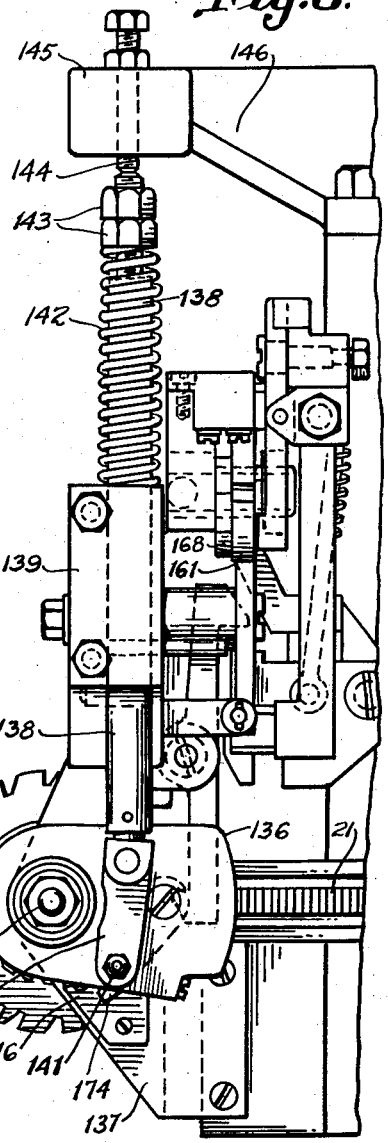
Figure 8 is a front elevation of the parts shown in Figure 7.

The plate 136 will be moved from the vertical position shown in Figure 12 to the horizontal position shown in Figure 8, the crank pin 135 moving toward the right in the track 20 forcing the rack bar 21 to the right and rotating the files. The ratio between the gears 24 and the throw of the crank pin 135 is such as to produce a 180° angular axial movement of the files.

It is obvious that while 180° angular displacement is proper for a flat file, the three faces of a triangular file must be brought successively into engagement with the test bars by angular movements of 120°, square files by angular movements of 90°, etc. This is accomplished by means of devices which impart appropriate successive alterations to the oscillatory movement of the plate 136 so as to bring about three step or four step reciprocation in one direction as the case may be of the rack bar 21.

The means for doing this comprises a pin 148 fixed to the plunger 138 and projecting radially therefrom through a slot 149 in the guide 139. This pin is engaged by one of a number of interchangeable stop plates which are removably mounted upon a sleeve 152 journalled upon a pin 153 carried by a portion of the structure which constitutes a part of the guide 139. The sleeve 152 is intermittently rotated by a ratchet 154 engaged by a fixed pawl 155 shown in Figure 64. Said pawl is normally biased towards said ratchet by a spring detent 156.

Figure 64:
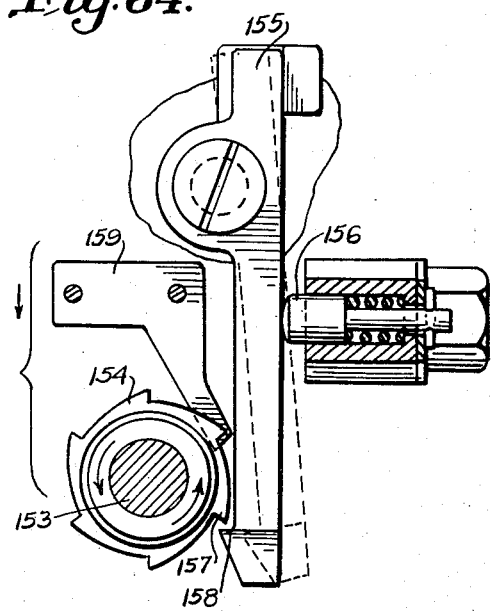
Figure 64 is a section taken on the line 64—64 of Figure 12.
Figure 65:
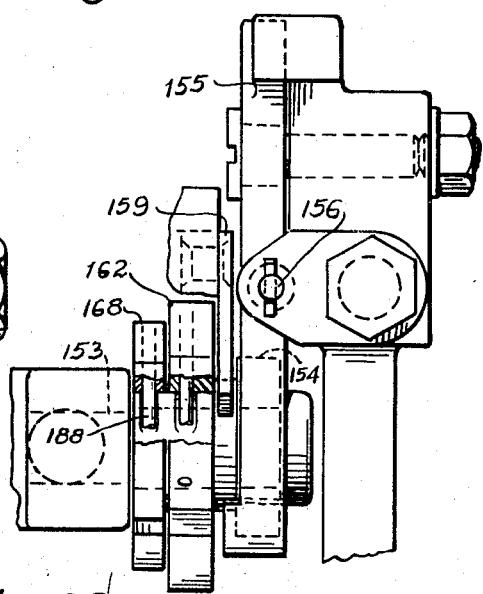
Figure 65 is a side elevation partly in section of the parts shown in Figure 64.
Figure 67:
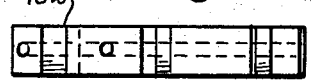
Figure 67 is a plan view of the locking disk shown in Figure 66.
Figure 69:
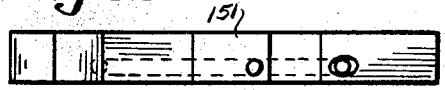
Figure 69 is a top plan view of the stop plate shown in Figure 68.
Figure 66:
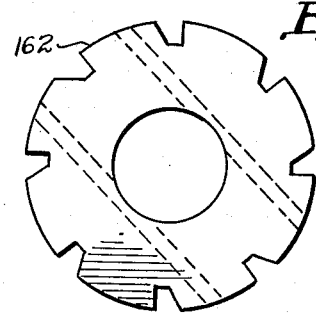
Figure 66 is a face elevation of a locking disk used in connection with the parts shown in Figure 65.
Figure 68:
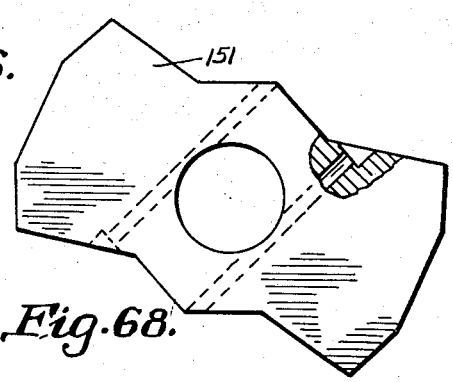
Figure 68 is a face elevation partly in section of a modified form of stop plate to be substituted for the one shown in Figure 65.
Figure 70:
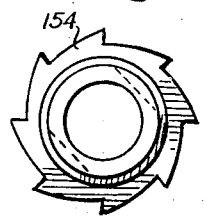
Figure 70 is a detail end elevation of the ratchet shown in Figure 64.
Figure 71:
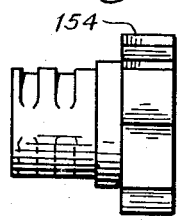
Figure 71 is a side elevatiton of the ratchet shown in Figure 70.

It will be understood that the ratchet 154 moves upward and downward with the movements of the carriage 14 with which it travels, that during the downward movement of said carriage, a tooth 157 of said ratchet engages a shoulder 158 of said pawl, rotating said ratchet counter-clockwise as viewed in Figure 64, and that when a step of rotation equal to the length of one tooth has been accomplished, the pawl is deflected out of engagement with the tooth by a cam 159 movable with the carriage. When the carriage starts to move upwardly, the pawl 158 is out of engagement with the ratchet and the stop plate 150 is not moved during this phase of travel of the carriage.

A locking pawl 160 normally engages one of a plurality of notches 161 in a locking disk 162 fixed with respect to the stop plate 150 and rotatable upon the sleeve 152. This pawl is of course movable with the carriage and holds the stop plate against movement excepting during a certain period of the downward movement of the carriage when the teeth of the ratchet 154 are in engagement with the pawl 155. During this movement, the pawl 160 is biased out of engagement with the notches 161 by coming into contact with a fixed pin 163 which locks it upon its pivot.

The stop plate 150 has successive faces 164, 165 and 166 which by step by step rotation of the ratchet 154 are brought into a horizontal plane in the path of movement of the pin 148 which as has been stated, is fixed to the plunger and partakes of the relative movement of the plunger to the rest of the carriage mounted parts only when the plunger is in contact with the stop 144 when the carriage is near the upper end of its upward movement.

Figure 7:
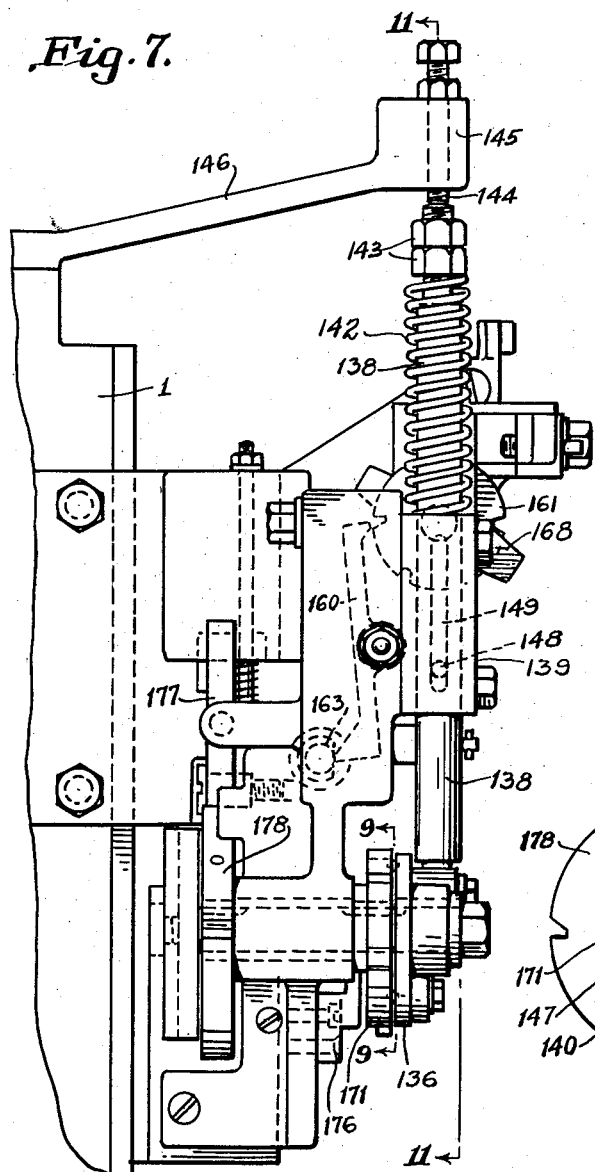
Figure 7 is a side elevation of the tool revolving mechanism located at the upper part of the machine.

It will be understood from Figure 7 that when the carriage starts to come down after the spring 142 has been compressed on the final part of the previous up stroke, the pin 148 travels upward in the slot 149. The periodic rotation of the stop plate 150 presents successively the stop faces 164, 165, 166, 167, 168, and 169 as an interference to the upward movement of said pin. It will be noted that some of these faces are at a greater distance than others from the axis of rotation of said stop plate. Thus the upper limit of movement of the plunger and the upper limit of oscillation of the plate 136 is unequally shortened on successive down strokes of the carriage 14, the lower limit of oscillation of the plate 136 remaining unchanged, the result being that the amplitude of oscillation of the plate 136 is modified to a definite and unequal degree on successive movements of the carriage through the automatic position of the stop plate 150.

Figure 9:
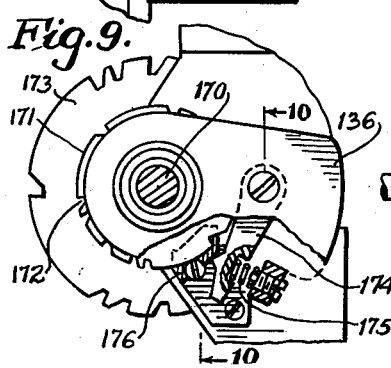
Figure 9 is a section on the line 9—9 of Figure 7.
Figure 10:
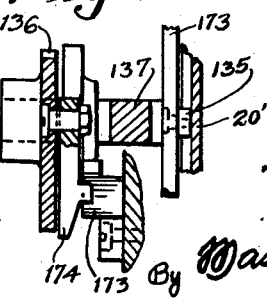
Figure 10 is a section on the line 10—10 of Figure 9.
Figure 29:
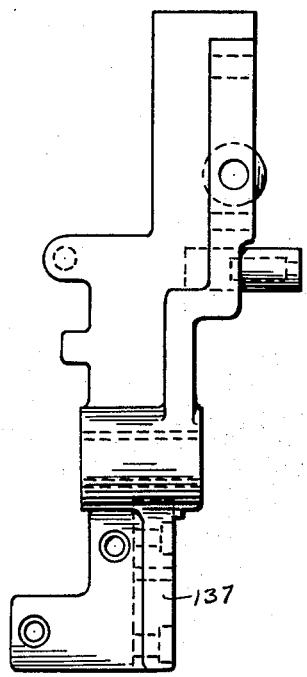
Figure 29 is an end elevation of the bracket for supporting the tool revolving mechanism.
Figure 28:
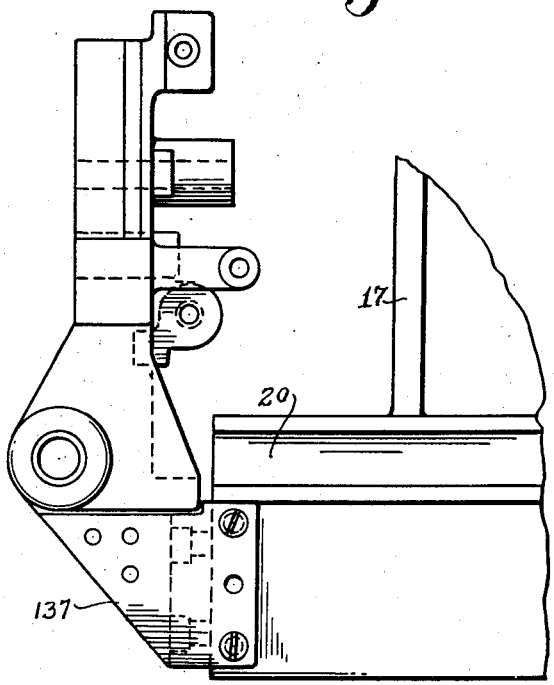
Figure 28 is an elevation showing a fragment of the sliding bracket and attached thereto the bracket for supporting the tool revolving mechanism.
Figure 30:
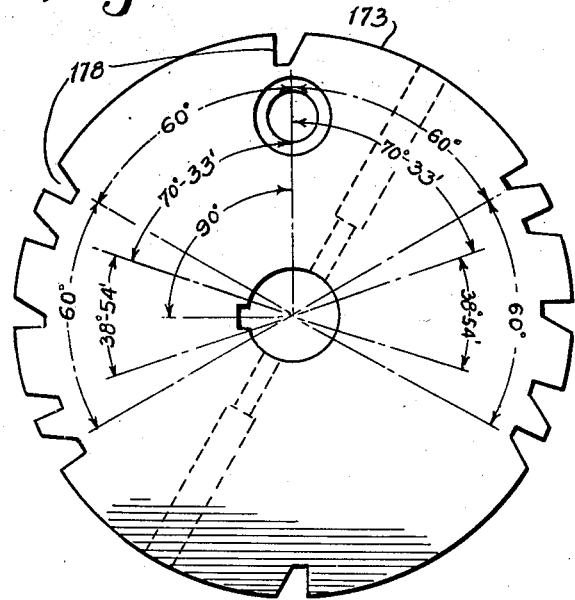
Figure 30 is a face elevation of the locking disk used in connection with the tool revolving mechanism.
Figure 31:
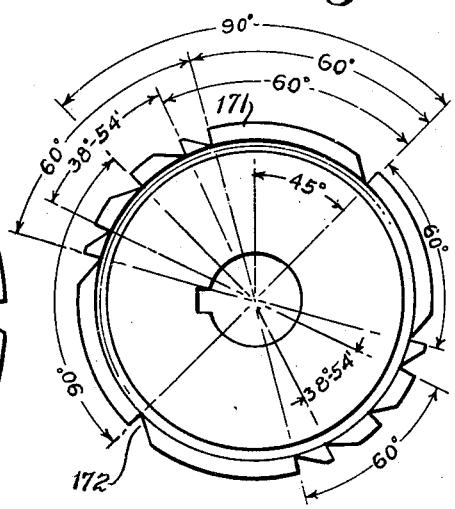
Figure 31 is a face elevation of the ratchet used in connection with the tool revolving mechanism.

Now, the purpose of this is to move the rack bar in one direction three equal distances on three successive up strokes of the carriage 14 for the purpose of presenting the three faces of triangular files to the test bars. The plate 136 accomplishes this function as follows: Figure 15 shows that the plate 136 is mounted for free rotation upon a shaft 170 and that on said shaft is a ratchet 171 having teeth 172 arranged in a definite, and in general, unequal relation. A locking disk 173 is also keyed to said disk. The plate 136 drives the ratchet 171 and with it, the shaft 170 and the locking wheel by means of a pawl 174. Said pawl is biased into engagement with said ratchet by means of a spring 175, Figure 9, and after it has carried the ratchet around an angular distance corresponding to the amplitude of oscillation of the plate 136, the ratchet is carried out of the tooth which it has been engaging by a fixed cam plate 176. The teeth are arranged on the ratchet 171 so that the pawl 174 picks up a tooth at the beginning of the downward movement of the plunger 138 determined by the limit imposed upon its previous upward movement by the stop plate 150 and carries that tooth and with it the ratchet through an angular displacement and until the plate 136 reaches its horizontal position, which as stated, is always the same. The travel of the plunger and the oscillation of the plate 136 in transmitting the three successive steps of movement to the rack bar 21, through the pin 135 are not of uniform extent for it will be understood that rotary motion of the plate 136 must be translated into three steps of rectilinear movement of the rack bar 21 through the crank pin 135 which does not always start from the same angular position with respect to the axis of the shaft 170.

Since it is essential that the faces of the files be made absolutely flat while working upon the test bars and that this result can only be accomplished by inhibiting any tendency of said files to rotate, a locking pawl 177 is arranged to engage in suitably positioned notches 178 in the locking disk. Said pawl necessarily travels with the carriage being normally biased into engagement with the notches of the locking disks by a spring detent 179. It is of course desired that the locking pawl should be released before the next advance movement of the plate 136 and pawl 174. Therefore just after the beginning of the up stroke of the carriage, the pawl 177 encounters a trip 180, pivotally mounted at 181 to a fixed part of the machine and yieldingly braced against displacement of the pawl 177 by the spring 182 positioned around the rod 183 pivoted to the trip 180 and normally compressed between a fixed element 184 and a nut 185 on the end of the rod 183 which just after the up stroke of the carriage begins, a nose 186 of the pawl 177 cams against a face 187 of the trip 180 tilting said pawl to a position of disengagement. It will of course be understood from the previous description that the movement of the plate with consequent rotation of the ratchet 171 and with it the disk 173 takes place near the upper limit of the range of travel of the carriage.

When changing from a set of triangular files to a set of square files, it is merely necessary to remove the stop plate 150, locking plate 162 and ratchet 154 as a unit having six indexes and replacing with a similar unit having eight indexes, which will cause four equal steps of rectilinear travel of the rack bar 21 in the same direction.

It will be understood from the foregoing description that I have produced a file testing device in which everyone of the gang of files is subjected impartially to the same test with scientific precision; that no element of tolerance can inadvertently affect the fairness of the test; that the working capacity of the files is determined by the weight of material cut from the test bars; that since each file is presented successively to each of the test bars inequality in the hardness of the test bars can produce no element of partiality to the test since each file successively makes a stroke against each test bar; that the pressure of each file against its test bar is absolutely equal, being independent of any part of the machine other than the value of the equal weights which are employed to press the test bars against the files; that the machine is adaptable for files of different length, and that it operates with equal fairness and efficiency on any shape of file whether it be flat, triangular, square or of any other commercial shape.

What I claim is:

1. Comparative testing machine for files and the like, comprising a file holder having means for receiving a plurality of files with their axes parallel, said file holder being reciprocable, a test bar holder mounted to rotate in a plane parallel to the plane of reciprocation of said file holder, a circumferential series of test bars slidably fitting in bores in said test bar holder and slidable perpendicular to the plane of rotation of said test bar holder, said test bars having heads, independent feeding means for said test bars equal in number to that of the files which the machine has the capacity to test, slidable towards and from the plane of reciprocation of said files, said feeding means being provided at their ends with means for laterally receiving and passing the heads of said test bars as the test bar holder rotates, said last named means being constructed to engage the heads of said test bars for pushing and pulling, means for imparting step by step rotation to said test bar holder for advancing the test bars successively from one feeding means to another and with respect to all said files, common means for retracting all said feeding means and means individual to said feeding means for advancing the test bars controlled thereby against said files with uniform pressure.

2. Comparative testing machine for files as claimed in claim 1, including a carriage on the opposite side of the plane of reciprocation of said files from said test bars, rollers mounted on said carriage individual to said files and means for adjustably moving said carriage to bring said rollers into contact with said files at points opposite said test bars.

3. Comparative testing machine for files as claimed in claim 1, including friction brakes carried by said test bar holder for engaging said test bars to inhibit sliding movement thereof while said test bars are out of the control of said feeding means, and means adjacent said feeding means engageable by the brakes of those test bars which are in the control of said feeding means automatically releasing said brakes to prevent the value of their friction affecting the uniform pressure with which the test bars are applied to said files.

4. Comparative testing machine for files as claimed in claim 1, the means for advancing the said test bars with uniform pressure against said files comprising individual weights of uniform value.

5. Comparative testing machine for files as claimed in claim 1, the means for retracting said feeding means comprising a slidably mounted carriage, clutch connections individual to said feeding means movable with said carriage, means for automatically releasing said connections from said feeding means during the advance movements of said feeding means, said connections engaging said feeding means while the test bars are against said files for compensating for unequal wear of said test bars, whereby the means for receiving and passing the heads of said test bars may always return to positions of lateral alinement in the path of the circumferential series of test bars.

6. Comparative testing machine for files as claimed in claim 1, the means for receiving said files being capable of rotation, and means for rotating said receiving means while said test bars are retracted from said files to bring fresh file surfaces into operative position with respect to said test bars.

7. Comparative testing machine for files as claimed in claim 1, said file holder including a rack bar laterally reciprocable relative to the direction of reciprocation of said file holder, said means for receiving a plurality of files being provided with a plurality of pinions in mesh with said rack bar, and means movable in response to the reciprocation of said file holder for imparting the said lateral movement to said rack bar on each up stroke of said file holder for changing the orientation of the faces of said files.

8. Comparative testing machine for files and the like, comprising a file holder having means for receiving a plurality of files with their axes parallel, said file holder being reciprocable, a test bar holder mounted to rotate in a plane parallel to the plane of reciprocation of said file holder, a circumferential series of test bars slidably fitting in bores in said test bar holder and slidable perpendicular to the plane of rotation of said test bar holder, said test bars having heads, independent feeding means for said test bars equal in number to that of the files which the machine has the capacity to test, slidable towards and from the plane of reciprocation of said files, said feeding means being provided at their ends with means for laterally receiving and passing the heads of said test bars as the test bar holder rotates, said last named means being constructed to engage the heads of said test bars for pushing and pulling, means for imparting step by step rotation to said test bar holder for advancing the test bars successively from one feeding means to another and with respect to said files, common means for retracting all said feeding means, means individual to said feeding means for advancing the test bars controlled thereby against said files with uniform pressure, said file holder including a rack bar laterally reciprocable relative to the direction of reciprocation of said file holder, said means for receiving a plurality of files being provided with a plurality of pinions in mesh with said rack bar, means movable in response to the reciprocation of said file holder for imparting the said lateral movement to said rack bar on each up stroke of said file holder for changing the orientation of the faces of said files, said rack bar reciprocating means comprising an oscillatably mounted plate carried by said file holder, a plunger connected to said plate and also traveling with said file holder, said plunger adjacent the end of the up stroke of the file holder being engageable with a fixed stop for inhibiting the travel of said plunger and producing relative motion between said plunger and the part movable with said file holder on which said oscillatable plate is mounted, for oscillating said plate.

9. Comparative testing machine for files and the like comprising a file holder having means for receiving a plurality of files with their axes parallel, said file holder being reciprocable, a test bar holder mounted to rotate in a plane parallel to the plane of reciprocation of the file holder, a circumferential series of test bars slidably fitting in bores in said test bar holder and slidable perpendicular to the plane of rotation of said test bar holder, said test bars having heads, independent feeding means for said test bars equal in number to that of the files which the machine has the capacity to test, slidable toward and from the plane of the reciprocation of said files, said feeding means being provided at their ends with means for laterally receiving and passing the heads of said test bars as the test bar holder rotates, said last named means being constructed to engage the heads of said test bars for pushing and pulling, means for imparting step by step rotation to said test bar holder for advancing the test bars successively from one feeding means to another and with respect to said files, common means for retracting all of said feeding means together with the test bars controlled thereby, means individual to said feeding means for advancing the test bars controlled thereby against the files with uniform pressure, means for selectively changing the length of the range of travel of said file holder, and means for lengthening the dwell of the test bars against said files.

10. Comparative testing machine for files and the like, comprising a file holder having means for receiving a plurality of files with their axes parallel, said file holder being reciprocable, a test bar holder mounted to rotate in a plane parallel to the plane of reciprocation of said file holder, a circumferential series of test bars slidably fitting in bores in said test bar holder and slidable perpendicular to the plane of rotation of said test bar holder, said test bars having detachable heads permitting replacement of said test bars, independent feeding means for said test bars equal in number to that of the files which the machine has the capacity to test, slidable towards and from the plane of reciprocation of said files, said feeding means being provided at their ends with means for laterally receiving and passing the heads of said test bars as the test bar holder rotates, said last named means being constructed to engage the heads of said test bars for pushing and pulling, means for imparting step by step rotation to said test bar holder for advancing the test bars successively from one feeding means to another and with respect to said files, common means for retracting all said feeding means, and means individual to said feeding means for advancing the test bars controlled thereby against said files with uniform pressure.

11. Comparative testing machine for files as claimed in claim 9, the means for lengthening the dwell of said test bars against said files comprising a cam having a removable section, a lever actuated by said cam for operating the common means for retracting said feeding means, said section when removed, shortening the retractile movement of said feeding means and correspondingly lengthening the period between successive retractile movements.

12. Comparative testing machine for files and the like, as claimed in claim 8, including means for modifying the amplitude of oscillation of said plate on successive upward movements of said file holder comprising rotatable members carried by said file holder having stop faces at different distances from their axes of rotation adapted to be brought into the path of a stop on said plunger upon successive strokes of said file holding means, and fixed means operatively related to said rotatable member for rotating the latter during the translatory movement of said file holding means.

FREDERICK HERBERT SMITH.